(12) United States Patent
Turner et al.

(10) Patent No.: US 6,633,742 B1
(45) Date of Patent: Oct. 14, 2003

(54) SYSTEM AND METHOD FOR ADAPTIVE KNOWLEDGE ACCESS AND PRESENTATION

(75) Inventors: David Turner, Kirkland, WA (US); Waldemar Frank, Bellevue, WA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 47 days.

(21) Appl. No.: 09/858,237

(22) Filed: May 15, 2001

(51) Int. Cl.⁷ ................................................. G09B 3/00
(52) U.S. Cl. ........................................ 434/350; 707/3
(58) Field of Search ............................... 434/350, 219, 434/118, 322, 323; 395/927; 707/3–6

(56) References Cited

U.S. PATENT DOCUMENTS

| | | | | |
|---|---|---|---|---|
| 4,804,328 A | * | 2/1989 | Barrabee | 434/308 |
| 5,597,312 A | * | 1/1997 | Bloom et al. | 434/118 |
| 5,772,446 A | * | 6/1998 | Rosen | 434/307 R |
| 6,062,862 A | * | 5/2000 | Koskinen | 434/107 |
| 6,236,987 B1 | * | 5/2001 | Horowitz et al. | 705/35 |

OTHER PUBLICATIONS

Epss.com!™ Adam O'Gorman "The Application of Evolutionary Learning Theory In The Transition From Training To Performance Support", obtained at internet address http://www.epss.com/main.htm, pp. 1–4, May 15, 2001.
Epss.com!™ Glossary, obtained at internet address http://www.epss.com/ib/concepts/keyconcepts.htm, pp. 1–5, May 15, 2001.
Epss.com!™ Barry Raybould, "Performance Support Engineering: An Emerging Development Methodology for Enabling Organizational Learning", obtained at internet address http://www.epss.com/lb/artonlin/articles/br2.htm, pp. 1–8, May 15, 2001.
Siemens "Integrating Medical Imaging" brochure, pp. 1–14.
David Turner Declaration dated Aug. 20, 2001, 3 pages.

* cited by examiner

*Primary Examiner*—Henry C. Yuen

(57) ABSTRACT

An adaptive performance support system is disclosed for facilitating access and presentation of information to a user. The system receives input of a scope of interest of the user including an access level, a working mode and a lesson/task/subject. The access level reflects the proficiency level of the user, such as novice, intermediate or advanced. The working mode reflects what the user wants to do, such as undertake a lesson to learn about, perform a task or browse topical or task related information on a particular subject. The lesson/task/subject is the subject matter of interest to the user. The system then selects information relevant to the chosen lesson/task/subject, oriented to the specified working mode and appropriate to the specified access level from a general pool of knowledge. The selected information is then interactively presented to the user avoiding the presentation of extraneous information.

87 Claims, 8 Drawing Sheets

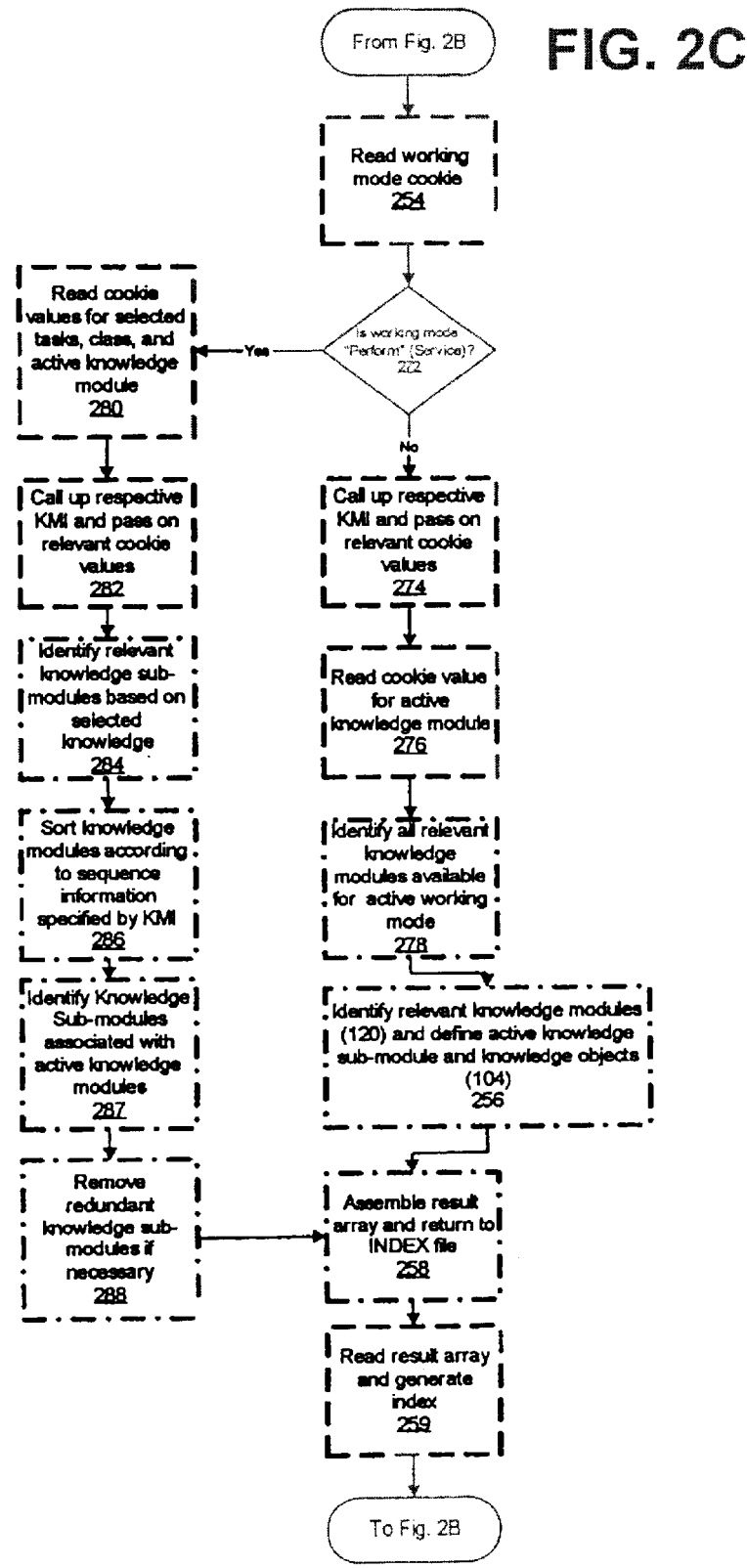

SYSTEM AND METHOD FOR ADAPTIVE KNOWLEDGE ACCESS AND PRESENTATION

REFERENCE TO COMPUTER PROGRAM LISTINGS SUBMITTED ON COMPACT DISK

A compact disk appendix is included containing computer program code listings pursuant to 37 C.F.R. 1.52(e) and is hereby incorporated by reference. The compact disk contains program code files in ASCII format as well as graphic image files in binary format. The graphic image files are submitted as place holders for references within the ASCII code listings to indicate to one of ordinary skill in the art where to substitute suitable graphical images. One of ordinary skill in the art will appreciate that the contents of the graphic image files is not necessary to the operation of the disclosed embodiments. The total number of compact disks is 1 and the files included on the compact disk are as follows:

| Creation Date | Creation Time | File Size (Bytes) | File Name |
|---|---|---|---|
| Root Directory | | | |
| 05/11/2001 | 03:00a | 791 | default.htm |
| 05/11/2001 | 03:00a | <DIR> | interface |
| 05/11/2001 | 03:00a | <DIR> | knowledge |
| 1 file(s) | | | |
| 791 bytes | | | |
| directory of | | | |
| d:\interface | | | |
| 05/11/2001 | 03:00a | <DIR> | . |
| 05/11/2001 | 03:00a | <DIR> | .. |
| 05/11/2001 | 03:00a | <DIR> | graphics |
| 05/11/2001 | 03:00a | <DIR> | html |
| 05/11/2001 | 03:00a | <DIR> | javascripts |
| 05/11/2001 | 03:00a | <DIR> | style_sheets |
| 0 file(s) 0 bytes | | | |
| directory of | | | |
| d:\interface\graphics | | | |
| 05/11/2001 | 03:00a | <DIR> | . |
| 05/11/2001 | 03:00a | <DIR> | .. |
| 05/11/2001 | 03:00a | 151 | about_aps_out.gif |
| 05/11/2001 | 03:00a | 157 | about_aps_over.gif |
| 05/11/2001 | 03:00a | 240 | acoustic_output_out.gif |
| 05/11/2001 | 03:00a | 248 | acoustic_output_over.gif |
| 05/11/2001 | 03:00a | 103 | aps_help_out.gif |
| 05/11/2001 | 03:00a | 109 | aps_help_over.gif |
| 05/11/2001 | 03:00a | 154 | aps_setup_out.gif |
| 05/11/2001 | 03:00a | 160 | aps_setup_over.gif |
| 05/11/2001 | 03:00a | 1,592 | aps_start_page_bg.gif |
| 05/11/2001 | 03:00a | 341 | arrow2_previous_out.gif |
| 05/11/2001 | 03:00a | 496 | arrow_previous_over.gif |
| 05/11/2001 | 03:00a | 370 | arrow_previous_out.gif |
| 05/11/2001 | 03:00a | 363 | arrow2_previous_over.gif |
| 05/11/2001 | 03:00a | 278 | arrow2_next_disabled.gif |
| 05/11/2001 | 03:00a | 338 | arrow2_next_out.gif |
| 05/11/2001 | 03:00a | 368 | arrow2_next_over.gif |
| 05/11/2001 | 03:00a | 280 | arrow2_previous_disabled.gif |
| 05/11/2001 | 03:00a | 341 | arrow_next_disabled.gif |
| 05/11/2001 | 03:00a | 366 | arrow_next_out.gif |
| 05/11/2001 | 03:00a | 496 | arrow_next_over.gif |
| 05/11/2001 | 03:00a | 337 | arrow_previous_disabled.gif |
| 05/11/2001 | 03:00a | 329 | biohazard_considerations_out.gif |
| 05/11/2001 | 03:00a | 342 | biohazard_considerations_over.gif |
| 05/11/2001 | 03:00a | 125 | bookmark_view_out.gif |
| 05/11/2001 | 03:00a | 132 | bookmark_view_over.gif |
| 05/11/2001 | 03:00a | 144 | bookmark_out.gif |
| 05/11/2001 | 03:00a | 144 | bookmark_over.gif |
| 05/11/2001 | 03:00a | 119 | bookmark_set_out.gif |

-continued

| Creation Date | Creation Time | File Size (Bytes) | File Name |
|---|---|---|---|
| 05/11/2001 | 03:00a | 127 | bookmark_set_over.gif |
| 05/11/2001 | 03:00a | 188 | button_help_out.gif |
| 05/11/2001 | 03:00a | 196 | button_reset_over.gif |
| 05/11/2001 | 03:00a | 188 | button_help_over.gif |
| 05/11/2001 | 03:00a | 162 | button_ok_out.gif |
| 05/11/2001 | 03:00a | 196 | button_reset_out.gif |
| 05/11/2001 | 03:00a | 162 | button_ok_over.gif |
| 05/11/2001 | 03:00a | 196 | button_cancel_out.gif |
| 05/11/2001 | 03:00a | 196 | button_cancel_over.gif |
| 05/11/2001 | 03:00a | 200 | button_delete_out.gif |
| 05/11/2001 | 03:00a | 200 | button_delete_over.gif |
| 05/11/2001 | 03:00a | 189 | cables_out.gif |
| 05/11/2001 | 03:00a | 195 | cables_over.gif |
| 05/11/2001 | 03:00a | 215 | certification_out.gif |
| 05/11/2001 | 03:00a | 222 | certification_over.gif |
| 05/11/2001 | 03:00a | 223 | configuration_out.gif |
| 05/11/2001 | 03:00a | 227 | configuration_over.gif |
| 05/11/2001 | 03:00a | 125 | contact_out.gif |
| 05/11/2001 | 03:00a | 131 | contact_over.gif |
| 05/11/2001 | 03:00a | 227 | control_panel_out.gif |
| 05/11/2001 | 03:00a | 231 | control_panel_over.gif |
| 05/11/2001 | 03:00a | 145 | copyright_out.gif |
| 05/11/2001 | 03:00a | 151 | copyright_over.gif |
| 05/11/2001 | 03:00a | 225 | course_overview_out.gif |
| 05/11/2001 | 03:00a | 225 | course_overview_over.gif |
| 05/11/2001 | 03:00a | 216 | course_review_out.gif |
| 05/11/2001 | 03:00a | 216 | course_review_over.gif |
| 05/11/2001 | 03:00a | 241 | descriptive_list_out.gif |
| 05/11/2001 | 03:00a | 249 | descriptive_list_over.gif |
| 05/11/2001 | 03:00a | 252 | device_compliance_out.gif |
| 05/11/2001 | 03:00a | 257 | device_compliance_over.gif |
| 05/11/2001 | 03:00a | 147 | disclaimer_out.gif |
| 05/11/2001 | 03:00a | 153 | disclaimer_over.gif |
| 05/11/2001 | 03:00a | 246 | electrical_safety_out.gif |
| 05/11/2001 | 03:00a | 254 | electrical_safety_over.gif |
| 05/11/2001 | 03:00a | 230 | equipment_care_over.gif |
| 05/11/2001 | 03:00a | 230 | equipment_care_out.gif |
| 05/11/2001 | 03:00a | 149 | exit_out.gif |
| 05/11/2001 | 03:00a | 149 | exit_over.gif |
| 05/11/2001 | 03:00a | 130 | glossary_out.gif |
| 05/11/2001 | 03:00a | 144 | glossary_over.gif |
| 05/11/2001 | 03:00a | 875 | header_example.gif |
| 05/11/2001 | 03:00a | 317 | help_disabled.gif |
| 05/11/2001 | 03:00a | 338 | help_out.gif |
| 05/11/2001 | 03:00a | 460 | help_over.gif |
| 05/11/2001 | 03:00a | 131 | home_out.gif |
| 05/11/2001 | 03:00a | 131 | home_over.gif |
| 05/11/2001 | 03:00a | 63 | icon_bullet.gif |
| 05/11/2001 | 03:00a | 383 | icon_caution.gif |
| 05/11/2001 | 03:00a | 125 | icon_edit.gif |
| 05/11/2001 | 03:00a | 447 | icon_help.gif |
| 05/11/2001 | 03:00a | 146 | icon_illustration.gif |
| 05/11/2001 | 03:00a | 420 | icon_info.gif |
| 05/11/2001 | 03:00a | 94 | icon_item_info.gif |
| 05/11/2001 | 03:00a | 384 | icon_warning.gif |
| 05/11/2001 | 03:00a | 197 | imaging_out.gif |
| 05/11/2001 | 03:00a | 202 | imaging_over.gif |
| 05/11/2001 | 03:00a | 58 | index_pointer_active.gif |
| 05/11/2001 | 03:00a | 58 | index_pointer_hover.gif |
| 05/11/2001 | 03:00a | 77 | index_pointer_subtopic.gif |
| 05/11/2001 | 03:00a | 55 | index_pointer_topic.gif |
| 05/11/2001 | 03:00a | 242 | info_disabled.gif |
| 05/11/2001 | 03:00a | 320 | info_out.gif |
| 05/11/2001 | 03:00a | 435 | info_over.gif |
| 05/11/2001 | 03:00a | 208 | installation_out.gif |
| 05/11/2001 | 03:00a | 215 | installation_over.gif |
| 05/11/2001 | 03:00a | 155 | install_out.gif |
| 05/11/2001 | 03:00a | 155 | install_over.gif |
| 05/11/2001 | 03:00a | 210 | instructions_out.gif |
| 05/11/2001 | 03:00a | 215 | instructions_over.gif |
| 05/11/2001 | 03:00a | 240 | interactive_view_out.gif |
| 05/11/2001 | 03:00a | 245 | interactive_view_over.gif |
| 05/11/2001 | 03:00a | 216 | introduction_out.gif |
| 05/11/2001 | 03:00a | 217 | introduction_over.gif |
| 05/11/2001 | 03:00a | 205 | keyboard_out.gif |

-continued

| Creation Date | Creation Time | File Size (Bytes) | File Name |
|---|---|---|---|
| 05/11/2001 | 03:00a | 213 | keyboard_over.gif |
| 05/11/2001 | 03:00a | 267 | lesson_2_objectives_over.gif |
| 05/11/2001 | 03:00a | 265 | lesson_3_objectives_over.gif |
| 05/11/2001 | 03:00a | 238 | lesson_2_review_out.gif |
| 05/11/2001 | 03:00a | 238 | lesson_3_review_out.gif |
| 05/11/2001 | 03:00a | 247 | lesson_3_review_over.gif |
| 05/11/2001 | 03:00a | 245 | lesson_2_review_over.gif |
| 05/11/2001 | 03:00a | 258 | lesson_3_objectives_out.gif |
| 05/11/2001 | 03:00a | 258 | lesson_2_objectives_out.gif |
| 05/11/2001 | 03:00a | 170 | lessons.gif |
| 05/11/2001 | 03:00a | 240 | lesson_1_review_out.gif |
| 05/11/2001 | 03:00a | 259 | lesson_1_objectives_out.gif |
| 05/11/2001 | 03:00a | 269 | lesson_1_objectives_over.gif |
| 05/11/2001 | 03:00a | 246 | lesson_1_review_over.gif |
| 05/11/2001 | 03:00a | 733 | level2_header_example1.gif |
| 05/11/2001 | 03:00a | 445 | level2_header_example2.gif |
| 05/11/2001 | 03:00a | 2,631 | level2_index_example1.gif |
| 05/11/2001 | 03:00a | 600 | level2_arrows_example1.gif |
| 05/11/2001 | 03:00a | 125 | line_h3d.gif |
| 05/11/2001 | 03:00a | 173 | maintain_out.gif |
| 05/11/2001 | 03:00a | 173 | maintain_over.gif |
| 05/11/2001 | 03:00a | 197 | modules_out.gif |
| 05/11/2001 | 03:00a | 202 | modules_over.gif |
| 05/11/2001 | 03:00a | 2,890 | netscape_fonts_menu.gif |
| 05/11/2001 | 03:00a | 1,401 | netscape_style_sheets.gif |
| 05/11/2001 | 03:00a | 210 | objectives_out.gif |
| 05/11/2001 | 03:00a | 22 | objectives_over.gif |
| 05/11/2001 | 03:00a | 186 | oems_out.gif |
| 05/11/2001 | 03:00a | 191 | oems_over.gif |
| 05/11/2001 | 03:00a | 213 | oem_care_over.gif |
| 05/11/2001 | 03:00a | 205 | oem_care_out.gif |
| 05/11/2001 | 03:00a | 195 | options_out.gif |
| 05/11/2001 | 03:00a | 198 | options_over.gif |
| 05/11/2001 | 03:00a | 267 | planned_maintenance_out.gif |
| 05/11/2001 | 03:00a | 278 | planned_maintenance_over.gif |
| 05/11/2001 | 03:00a | 115 | print_out.gif |
| 05/11/2001 | 03:00a | 115 | print_over.gif |
| 05/11/2001 | 03:00a | 246 | product_orientation_out.gif |
| 05/11/2001 | 03:00a | 246 | product_orientation_over.gif |
| 05/11/2001 | 03:00a | 200 | questions_out.gif |
| 05/11/2001 | 03:00a | 207 | questions_over.gif |
| 05/11/2001 | 03:00a | 189 | repair_out.gif |
| 05/11/2001 | 03:00a | 192 | repair_over.gif |
| 05/11/2001 | 03:00a | 175 | replace_out.gif |
| 05/11/2001 | 03:00a | 175 | replace_over.gif |
| 05/11/2001 | 03:00a | 223 | sample_quiz_out.gif |
| 05/11/2001 | 03:00a | 230 | sample_quiz_over.gif |
| 05/11/2001 | 03:00a | 240 | screen_display_out.gif |
| 05/11/2001 | 03:00a | 249 | screen_display_over.gif |
| 05/11/2001 | 03:00a | 164 | search_out.gif |
| 05/11/2001 | 03:00a | 178 | search_over.gif |
| 05/11/2001 | 03:00a | 295 | see_also.gif |
| 05/11/2001 | 03:00a | 228 | service_software_out.gif |
| 05/11/2001 | 03:00a | 228 | service_software_over.gif |
| 05/11/2001 | 03:00a | 38 | site_map_out.gif |
| 05/11/2001 | 03:00a | 144 | site_map_over.gif |
| 05/11/2001 | 03:00a | 251 | site_requirements_out.gif |
| 05/11/2001 | 03:00a | 261 | site_requirements_over.gif |
| 05/11/2001 | 03:00a | 207 | spare_parts_out.gif |
| 05/11/2001 | 03:00a | 207 | spare_parts_over.gif |
| 05/11/2001 | 03:00a | 49 | square_003366.gif |
| 05/11/2001 | 03:00a | 49 | square_336699.gif |
| 05/11/2001 | 03:00a | 49 | square_ffffff.gif |
| 05/11/2001 | 03:00a | 43 | square_transparent.gif |
| 05/11/2001 | 03:00a | 269 | structure_and_navigation_out.gif |
| 05/11/2001 | 03:00a | 288 | structure_and_navigation_over.gif |
| 05/11/2001 | 03:00a | 65 | submenu_bg.gif |
| 05/11/2001 | 03:00a | 67 | submenu_button_bg.gif |
| 05/11/2001 | 03:00a | 225 | system_safety_out.gif |
| 05/11/2001 | 03:00a | 224 | system_service_over.gif |
| 05/11/2001 | 03:00a | 201 | system_over.gif |
| 05/11/2001 | 03:00a | 241 | system_operation_over.gif |
| 05/11/2001 | 03:00a | 280 | system_maintenance_over.gif |
| 05/11/2001 | 03:00a | 223 | system_care_out.gif |
| 05/11/2001 | 03:00a | 5,654 | system_cabeling.gif |
| 05/11/2001 | 03:00a | 241 | system_operation_out.gif |
| 05/11/2001 | 03:00a | 225 | system_safety_over.gif |
| 05/11/2001 | 03:00a | 229 | system_care_over.gif |
| 05/11/2001 | 03:00a | 224 | system_service_out.gif |
| 05/11/2001 | 03:00a | 266 | symbols_and_labels_out.gif |
| 05/11/2001 | 03:00a | 277 | symbols_and_labels_over.gif |
| 05/11/2001 | 03:00a | 283 | syngo_service_software_out.gif |
| 05/11/2001 | 03:00a | 290 | syngo_service_software_over.gif |
| 05/11/2001 | 03:00a | 195 | system_out.gif |
| 05/11/2001 | 03:00a | 263 | system_architecture_out.gif |
| 05/11/2001 | 03:00a | 273 | system_architecture_over.gif |
| 05/11/2001 | 03:00a | 268 | system_maintenance_out.gif |
| 05/11/2001 | 03:00a | 255 | task_card_service_out.gif |
| 05/11/2001 | 03:00a | 246 | task_card_learn_out.gif |
| 05/11/2001 | 03:00a | 6,104 | task_card_bg.gif |
| 05/11/2001 | 03:00a | 209 | task_card_service_active.gif |
| 05/11/2001 | 03:00a | 256 | task_card_service_over.gif |
| 05/11/2001 | 03:00a | 199 | task_card_learn_active.gif |
| 05/11/2001 | 03:00a | 1,814 | tabs.gif |
| 05/11/2001 | 03:00a | 228 | tab_replace.gif |
| 05/11/2001 | 03:00a | 244 | task_card_learn_over.gif |
| 05/11/2001 | 03:00a | 158 | tasks.gif |
| 05/11/2001 | 03:00a | 210 | task_card_browse_active.gif |
| 05/11/2001 | 03:00a | 259 | task_card_browse_out.gif |
| 05/11/2001 | 03:00a | 258 | task_card_browse_over.gif |
| 05/11/2001 | 03:00a | 941 | task_card_index_bg.gif |
| 05/11/2001 | 03:00a | 287 | technical_descriptions_out.gif |
| 05/11/2001 | 03:00a | 287 | technical_descriptions_over.gif |
| 05/11/2001 | 03:00a | 141 | teknotes_out.gif |
| 05/11/2001 | 03:00a | 158 | teknotes_over.gif |
| 05/11/2001 | 03:00a | 203 | test_tools_out.gif |
| 05/11/2001 | 03:00a | 211 | test_tools_over.gif |
| 05/11/2001 | 03:00a | 162 | topics.gif |
| 05/11/2001 | 03:00a | 214 | transducers_out.gif |
| 05/11/2001 | 03:00a | 221 | transducers_over.gif |
| 05/11/2001 | 03:00a | 233 | transducer_care_out.gif |
| 05/11/2001 | 03:00a | 244 | transducer_care_over.gif |
| 05/11/2001 | 03:00a | 200 | troubleshoot_out.gif |
| 05/11/2001 | 03:00a | 200 | troubleshoot_over.gif |
| 05/11/2001 | 03:00a | 196 | tuneup_out.gif |
| 05/11/2001 | 03:00a | 201 | tuneup_over.gif |
| 05/11/2001 | 03:00a | 230 | user_interface_out.gif |
| 05/11/2001 | 03:00a | 234 | user_interface_over.gif |
| 05/11/2001 | 03:00a | 213 | user_manuals_out.gif |
| 05/11/2001 | 03:00a | 213 | user_manuals_over.gif |
| 05/11/2001 | 03:00a | 213 | user_manual_out.gif |
| 05/11/2001 | 03:00a | 213 | user_manual_over.gif |
| 05/11/2001 | 03:00a | 163 | whats_new_out.gif |
| 05/11/2001 | 03:00a | 169 | whats_new_over.gif |

227 file(s) 72,265 bytes
directory of d:\interface\html

| Creation Date | Creation Time | File Size (Bytes) | File Name |
|---|---|---|---|
| 05/11/2001 | 03:00a | <DIR> | . |
| 05/11/2001 | 03:00a | <DIR> | .. |
| 05/11/2001 | 03:00a | 4,071 | aps_help_1.htm |
| 05/11/2001 | 03:00a | 3,920 | aps_setup_1.htm |
| 05/11/2001 | 03:00a | 172 | blank_blue.htm |
| 05/11/2001 | 03:00a | 371 | blank_white.htm |
| 05/11/2001 | 03:00a | 2,905 | bookmarks_footer.htm |
| 05/11/2001 | 03:00a | 5,088 | bookmarks.htm |
| 05/11/2001 | 03:00a | 4,075 | contact_1.htm |
| 05/11/2001 | 03:00a | 4,451 | copyright_1.htm |
| 05/11/2001 | 03:00a | 3,920 | disclaimer_1.htm |
| 05/11/2001 | 03:00a | 5,937 | edit_bookmarks.htm |
| 05/11/2001 | 03:00a | 68,533 | home_menu.htm |
| 05/11/2001 | 03:00a | 1,733 | main_window.htm |
| 05/11/2001 | 03:00a | 11,069 | main_window_footer.htm |
| 05/11/2001 | 03:00a | 3,090 | main_window_header.htm |
| 05/11/2001 | 03:00a | 7,850 | main_window_index.htm |
| 05/11/2001 | 03:00a | 4,073 | site_map_1.htm |
| 05/11/2001 | 03:00a | 1,245 | start_apss.htm |
| 05/11/2001 | 03:00a | 532 | view_bookmarks.htm |

-continued

| Creation Date | Creation Time | File Size (Bytes) | File Name |
|---|---|---|---|
| 05/11/2001 | 03:00a | 2,877 | welcome.htm |
| 05/11/2001 | 03:00a | 3,918 | whats__new__1.htm |
| 20 file(s) | | | |
| 139,830 bytes | | | |
| directory of | | | |
| d:\interface\ | | | |
| javascripts | | | |
| 05/11/2001 | 03:00a | <DIR> | . |
| 05/11/2001 | 03:00a | <DIR> | .. |
| 05/11/2001 | 03:00a | 2,306 | check__browser.js |
| 05/11/2001 | 03:00a | 1,258 | default__mode.js |
| 05/11/2001 | 03:00a | 405 | enable__help.js |
| 05/11/2001 | 03:00a | 405 | enable__info.js |
| 05/11/2001 | 03:00a | 124 | exit__apss.js |
| 05/11/2001 | 03:00a | 4,452 | get__browse__topics.js |
| 05/11/2001 | 03:00a | 4,926 | get__learn__topics.js |
| 05/11/2001 | 03:00a | 6,028 | get__service__topics.js |
| 05/11/2001 | 03:00a | 1,968 | new__window.js |
| 05/11/2001 | 03:00a | 1,223 | set__bookmark.js |
| 05/11/2001 | 03:00a | 1,549 | set__files.js |
| 05/11/2001 | 03:00a | 492 | set__knowledge__cookie.js |
| 05/11/2001 | 03:00a | 1,248 | update__arrows.js |
| 05/11/2001 | 03:00a | 818 | update__page.js |
| 05/11/2001 | 03:00a | 1,007 | view__bookmark.js |
| 15 file(s) | | | |
| 28,209 bytes | | | |
| directory of | | | |
| d:\interface\ | | | |
| style__sheets | | | |
| 05/11/2001 | 03:00a | <DIR> | . |
| 05/11/2001 | 03:00a | <DIR> | .. |
| 05/11/2001 | 03:00a | 2,648 | contents.css |
| 05/11/2001 | 03:00a | 1,491 | data__entry__panel.css |
| 05/11/2001 | 03:00a | 2,670 | eps__user__guide.css |
| 05/11/2001 | 03:00a | 375 | header.css |
| 05/11/2001 | 03:00a | 1,717 | home__menu.css |
| 05/11/2001 | 03:00a | 1,668 | index.css |
| 05/11/2001 | 03:00a | 2,520 | item__info.css |
| 05/11/2001 | 03:00a | 2,268 | message.css |
| 8 file(s) | | | |
| 15,357 bytes | | | |
| directory of | | | |
| d:\knowledge | | | |
| 05/11/2001 | 03:00a | <DIR> | . |
| 05/11/2001 | 03:00a | <DIR> | .. |
| 05/11/2001 | 03:00a | <DIR> | browse |
| 05/11/2001 | 03:00a | <DIR> | learn |
| 05/11/2001 | 03:00a | <DIR> | service |
| 05/11/2001 | 03:00a | <DIR> | shared |
| 0 file(s) | | | |
| 0 bytes | | | |
| directory of | | | |
| d:\knowledge\ | | | |
| browse | | | |
| 05/11/2001 | 03:00a | <DIR> | . |
| 05/11/2001 | 03:00a | <DIR> | .. |
| 05/11/2001 | 03:00a | 901 | b__acoustic__output__1.htm |
| 05/11/2001 | 03:00a | 911 | b__biohazard__considerations__1.htm |
| 05/11/2001 | 03:00a | 985 | b__cables__1.htm |
| 05/11/2001 | 03:00a | 991 | b__descriptive__list__1.htm |
| 05/11/2001 | 03:00a | 791 | b__device__compliance__1.htm |
| 05/11/2001 | 03:00a | 792 | b__electrical__safety__1.htm |
| 05/11/2001 | 03:00a | 746 | b__interactive__view__1.htm |
| 05/11/2001 | 03:00a | 678 | b__modules__1.htm |
| 05/11/2001 | 03:00a | 865 | b__oems__1.htm |
| 05/11/2001 | 03:00a | 773 | b__oem__care__1.htm |
| 05/11/2001 | 03:00a | 791 | b__site__requirements__1.htm |
| 05/11/2001 | 03:00a | 793 | b__symbols__and__labels__1.htm |
| 05/11/2001 | 03:00a | 912 | b__syngo__service__software__1.htm |
| 05/11/2001 | 03:00a | 883 | b__system__1.htm |
| 05/11/2001 | 03:00a | 1,359 | b__system__care__1.htm |

-continued

| Creation Date | Creation Time | File Size (Bytes) | File Name |
|---|---|---|---|
| 05/11/2001 | 03:00a | 932 | b__test__tools__1.htm |
| 05/11/2001 | 03:00a | 994 | b__transducers__1.htm |
| 05/11/2001 | 03:00a | 787 | b__transducer__care__1.htm |
| 05/11/2001 | 03:00a | 926 | b__tune__up__1.htm |
| 19 file(s) | | | |
| 16,810 bytes | | | |
| directory of | | | |
| d:\knowledge\ | | | |
| learn | | | |
| 05/11/2001 | 03:00a | <DIR> | . |
| 05/11/2001 | 03:00a | <DIR> | .. |
| 05/11/2001 | 03:00a | 1,075 | 1__lesson__3__objectives__1.htm |
| 05/11/2001 | 03:00a | 772 | 1__lesson__3 __review__1.htm |
| 05/11/2001 | 03:00a | 850 | 1__certification__1.htm |
| 05/11/2001 | 03:00a | 859 | 1__configuration__1.htm |
| 05/11/2001 | 03:00a | 1,492 | 1__control__panel__1.htm |
| 05/11/2001 | 03:00a | 930 | 1__imaging__1.htm |
| 05/11/2001 | 03:00a | 1,034 | 1__installation__1.htm |
| 05/11/2001 | 03:00a | 876 | 1__instructions__1.htm |
| 05/11/2001 | 03:00a | 885 | 1__introduction__1.htm |
| 05/11/2001 | 03:00a | 841 | 1__keyboard__1.htm |
| 05/11/2001 | 03:00a | 894 | 1__lesson__2__objectives__1.htm |
| 05/11/2001 | 03:00a | 900 | 1__lesson__1__objectives__1.htm |
| 05/11/2001 | 03:00a | 1,415 | 1__lesson__1__review__1.htm |
| 05/11/2001 | 03:00a | 1,036 | 1__lesson__2__review__1.htm |
| 05/11/2001 | 03:00a | 839 | 1__objectives__1.htm |
| 05/11/2001 | 03:00a | 837 | 1__options__1.htm |
| 05/11/2001 | 03:00a | 1,042 | 1__planned__maintenance__1.htm |
| 05/11/2001 | 03:00a | 638 | 1__questions__1.htm |
| 05/11/2001 | 03:00a | 1,031 | 1__repair__1.htm |
| 05/11/2001 | 03:00a | 1,282 | 1__sample__quiz__1.htm |
| 05/11/2001 | 03:00a | 1,861 | 1__screen__display__1.htm |
| 05/11/2001 | 03:00a | 867 | 1__structure__navigation__1.htm |
| 05/11/2001 | 03:00a | 955 | 1__system__architecture__1.htm |
| 05/11/2001 | 03:00a | 855 | 1__transducers__1.htm |
| 05/11/2001 | 03:00a | 853 | 1__user__interface__1.htm |
| 25 file(s) | | | |
| 24,919 bytes | | | |
| directory of | | | |
| d:\knowledge\ | | | |
| service | | | |
| 05/11/2001 | 03:00a | <DIR> | . |
| 05/11/2001 | 03:00a | <DIR> | .. |
| 05/11/2001 | 03:00a | 3,615 | s__remove__item__5__1.htm |
| 05/11/2001 | 03:00a | 3,617 | s__install__item__5__1.htm |
| 05/11/2001 | 03:00a | 3,617 | s__install__item__4__1.htm |
| 05/11/2001 | 03:00a | 3,683 | s__install__item__1__1.htm |
| 05/11/2001 | 03:00a | 3,617 | s__install__item__2__1.htm |
| 05/11/2001 | 03:00a | 3,617 | s__install__item__3__1.htm |
| 05/11/2001 | 03:00a | 824 | s__precautions__1.htm |
| 05/11/2001 | 03:00a | 3,615 | s__remove__item__1__1.htm |
| 05/11/2001 | 03:00a | 3,615 | s__remove__item__2__1.htm |
| 05/11/2001 | 03:00a | 3,615 | s__remove__item__3__1.htm |
| 05/11/2001 | 03:00a | 3,615 | s__remove__item__4__1.htm |
| 1 file(s) | | | |
| 37,050 bytes | | | |
| directory of | | | |
| d:\knowledge\ | | | |
| shared | | | |
| 05/11/2001 | 03:00a | <DIR> | . |
| 05/11/2001 | 03:00a | <DIR> | .. |
| 05/11/2001 | 03:00a | 520 | glossary.htm |
| 05/11/2001 | 03:00a | 1,876 | glossary__header.htm |
| 05/11/2001 | 03:00a | 522 | glossary__content.htm |
| 3 file(s) | | | |
| 2,918 bytes | | | |
| total files | | | |
| listed: | | | |
| 329 file(s) | | | |
| 338,149 bytes | | | |
| 30 dir(s) | | | |

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

One of the largest areas in which computer technology has made a significant impact is in the area of education and training. Computer automation has simplified and automated the instructional process, allowing a computer to both automatically teach, tutor and evaluate students. Advances in computer data storage permit the storage of volumes of course/topical materials as well as vast reference libraries in a compact and electronically searchable form. Such libraries of materials permit users to locate necessary information in a matter of seconds from within vast volumes of data. In general, computer automation has reduced the costs and required resources of the instructional process while increasing the efficiency and effectiveness of that process.

Enterprises have embraced computer based instructional technologies for the purposes of educating and training their employees. Such systems are routinely utilized at every level of an organization, from secretaries learning to use the latest word processor, to service technicians learning to service the latest product of the enterprise. Further, these enterprises recognize the value of placing manuals, guides and other reference materials in an on-line/electronic format, for both internal reference and external publication.

Computer-based instruction, as typically implemented by an enterprise, takes three primary forms. The first form is as an on-line help system or on-line reference. These systems are typically coupled with a computer program and involve a user selecting a help option within that program. However, such a help system may also be offered separately. Selecting the help option typically brings up tools that allow the user to read or search through some form of an on-line reference or on-line manual for the program. These systems are often built by simply converting offline documentation into an electronic form and adding a search engine. While often, these systems work well, the user must be familiar with the terminology used in the program and must recognize when they have located the solution to their problem. Often, the help system addresses their problem in a different context from what the user expects, complicating the user's task in seeking assistance.

More advanced systems further provide assisted feedback to the user. Once the user has located the solution to their problem, they can select an option that will cause the help system to walk them through the steps of that solution. Typically, the help system will actually assist the user in operating the program to achieve the solution to the problem. Unfortunately, such systems suffer from the same problems as those of standard on-line help or reference systems, i.e. that the user needs to know what they are looking for and recognize the solution to their problem within a collection of information.

The most common form of computer-based instruction is the computer based tutorial. These are typically stand-alone programs that are designed to teach a user about a particular subject. In some computer-based tutorials, a testing system is provided which can be used to evaluate the user's proficiency with the subject. In most cases, these computer-based tutorials are modeled from off-line counterparts utilized in the classroom, such as lectures and demonstrations coupled with evaluations. The computer-based tutorial offers the advantage of automating the presentation and evaluation processes and permits the user to learn at their own pace. While these systems prove adequate in introducing a user to a broad subject or to a specific set of subjects, they often are unable to meet a user's specific needs. Further, they are often disconnected from the actual task or program that they are teaching and therefore lack an ability to provide feedback as the user actually attempts to put their knowledge into practice.

All of these systems are based on a traditional model of having the user search and retrieve information. This model requires a minimal understanding of the problem or task and recognition of the proper solution within a collection of information. Often, these systems result in excess extraneous information being presented, requiring the user to filter out the relevant information from the irrelevant information. The user may need to know where to look for the relevant material or skip through unnecessary or previously read material.

Similarly, with regard to task instructions, users may be provided with a detailed manual in hard copy that conforms to a pre-defined structure. For complex systems, such manuals may consist of several hundred pages. Even with a table of contents and index, using such instruction manuals can be time consuming and cumbersome. For an inexperienced user, the volume of information can be overwhelming and can result in increased time to task completion. For an experienced user, the volume of information can interfere with rapid location of information, also resulting in a longer time to task completion. It is assumed that the pre-defined structure of the document is suitable for all users.

One attempt to overcome these deficiencies involves breaking out information into separate documents such as (1) basic user information and (2) more advanced reference material. However, this method of documentation places additional burdens on the user, requiring him/her to look in more than one place for certain instructions. Converting paper documents to electronic form, as described above, does not eliminate user frustration. In some cases users even prefer paper manuals over online electronic documents; i.e., it can be easier to flip through pages rather than scrolling through long electronic documents.

Accordingly, there is a need for a computer based instructional system that adapts to the needs of the user, presents only relevant information, and generally provides an efficient interface for assisting the user in learning about or performing specific tasks.

SUMMARY

The present invention is defined by the following claims, and nothing in this section should be taken as a limitation on those claims. By way of introduction, the preferred embodiments described below relate to a system for facilitating access and presentation of information to a user. Given an access level, a working mode and a sub-topic, the system selects one or more knowledge objects, from a collection of knowledge objects, containing information appropriate to the specified access level, oriented to the specified working mode and relevant to the specified sub-topic. The information from these selected knowledge objects is then presented to the user.

In one embodiment, the system includes a user interface operative to receive a first specification defining a first access level of the user, a second specification defining a first working mode, and a third specification defining a first sub-topic. The system also includes a plurality of knowledge objects and a knowledge selector coupled with the user interface and the knowledge pool. The knowledge selector is operative to select a first selection of at least one relevant knowledge object based on the first, second and third specifications from the knowledge pool and provide the first selection to the user interface. The user interface is further operative to present the first selection to the user.

The preferred embodiments further relate to a method of facilitating access and presentation of information to a user. In one embodiment, the method includes receiving a first specification defining a first access level of the user, receiving a second specification defining a first working mode, receiving a third specification defining a first sub-topic, selecting, from a plurality of knowledge objects, a first selection of at least one relevant knowledge object based on the first, second and third specifications, and presenting the first selection to the user.

Further aspects and advantages of the invention are discussed below in conjunction with the preferred embodiments.

BRIEF DESCRIPTION OF THE DRAWINGS

FIGS. 2A–2C depict flow charts showing the operation of the embodiment of FIG. 1.

DETAILED DESCRIPTION OF THE PRESENTLY PREFERRED EMBODIMENTS

Figure 1A:
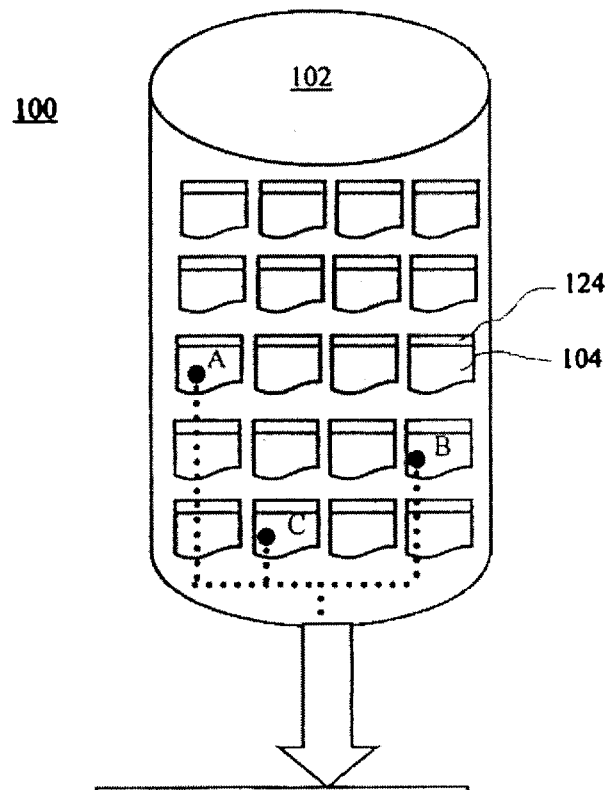
FIG. 1A depicts a block diagram of a first embodiment of an adaptive performance support system.

The embodiments described herein relate to an adaptive performance support system that provides guided learning and task performance instruction through a dynamic user interface. The system replaces conventional training and documentation with an integrated presentation of knowledge that adapts to the needs of the user. The disclosed embodiments do not require the user to search and retrieve instructions. Instead these embodiments dynamically adapt their presentation of information to varying users needs, relate information directly to their workflow, and contribute to the timely completion of the task at hand. In one embodiment, this method of task instruction is integrated with an adaptive learning system that also allows users to search for information in the traditional manner if they so choose.

Traditional computer-based learning is based on a search and retrieve model whereby the user searches a database, such as an on-line manual or other reference, for particular information about a task at hand. Information is retrieved from the database based on the user's search criteria. Typically, the user is either required to repeatedly refine and focus their search criteria or otherwise filter through the information retrieved to locate the information relevant to their needs.

The disclosed embodiments, in contrast, are based on a performance based "learn, perform, browse" model. The system includes a repository of information called a "knowledge pool." which contains all of the reference and tutorial information related to the general subject of interest, such as a particular product or process used or produced by the enterprise. Further, the knowledge pool contains different and/or adaptable versions of the information aimed at the different levels of competency/proficiency of the user, such as novice, intermediate or advanced. The levels of competency comprises these access levels, but additional or fewer levels may be used. The system further provides three modes of access to this knowledge pool, Learn, Perform and Browse, also known as the working modes and described in more detail below.

As used herein, a sub-topic refers to the specific subject matter of the user's query, i.e. the lesson, task or subject, and is defined as the particular subject matter of the lesson a user wishes to learn, the task or set of sub-tasks the user wishes to perform or the subject the user wishes to browse. As will be discussed, subject matter oriented to the learn working mode is referred to as a lesson, subject matter oriented to the Perform working mode is referred to as a task and subject matter oriented to the Browse working mode is referred to as a subject. One or more sub-topics, i.e. lessons, tasks/sub-tasks or subjects, may be related to a particular broader topic. In addition, one or more topics may be related, i.e. fall under a particular classification. The classification of topics allows the author/content developer to group topics within a working mode to additionally streamline the workflow; classifying topics depends on the complexity and purpose of the knowledge provided and applies in particular to topics/knowledge that are/is presented in an instructional form. For example, a classification for parts installation may include multiple topics/tasks related to the different parts which can be installed. Each topic/task is further related to one or more sub-topics, each of which describes one of the particular sub-tasks that must be performed in order to install the particular part. Further, the subject matter of one or more lessons, tasks or subjects may overlap, e.g. a lesson may teach a user how to perform a task.

In this system, the user selects, or the system may automatically determine, a user's competency/access level, a working mode, and a sub-topic, i.e. a lesson to learn about, a task to perform or subject to browse. The combination of access level, working mode and sub-topic defines a scope of subject-matter that the user is interested in. The system determines, based on the sub-topic, working mode and competency level, which information is relevant, i.e. within or encompassed by the scope interest, and the appropriate method of presentation of that information, in order to teach the lesson, accomplish the task or display the subject. In one embodiment, the user specifies the broader topic and the appropriate set of sub-topics is automatically determined. This information is then interactively presented to the user. Information outside the scope of subject matter of interest is suppressed, thereby only presenting to the user, that information that they need/want to know. In addition, the user may initially specify a language used by the system. In one embodiment, the system includes the Ultrasound Service Adaptive Performance Support System ("APS"), manufactured by Siemens Corporation, located in Issaquah, Wash. This system is utilized to train and provide reference support for ultrasound system field service engineers for particular ultrasound products of Siemens. In this system, the Perform working mode, discussed below, is referred to as the "service" working mode since the system is directed to service oriented sub-topics.

FIG. 1A, shows a block diagram of an exemplary adaptive performance support system 100. The system 100 includes a knowledge pool 102 and a dynamic presentation manager 108 coupled with the knowledge pool 102. Herein, the phrase "coupled with" is defined to mean directly connected to or indirectly connected with through one or more intermediate components. Such intermediate components may include both hardware and software based components.

The knowledge pool 102 is a repository of information related to a particular set of topics. The knowledge pool 102 includes one or more knowledge objects 104. A knowledge object 104 may include text, image, video, audio or other form of data, or combinations thereof. In one embodiment, a knowledge object 104 stores an application program such as an automated report generator application. Knowledge objects 104 may also contain one or more links, such as hypertext links, to other knowledge objects 104 or to external resources such as resources available on an intranet or on the Internet, such as web sites or electronic databases. In one embodiment, the data contained within the knowledge object 104 is stored as hypertext markup language ("HTML"). In an alternative embodiment, the data contained within the knowledge object 104 is stored as extensible markup language ("XML"). In yet another alternative embodiment, the knowledge object 104 further includes program code such as dynamic HTML or JavaScript/Java Applets that, as will be described in more detail below, can control the presentation or suppression of other content contained within the knowledge object 104.

Figure 1B:
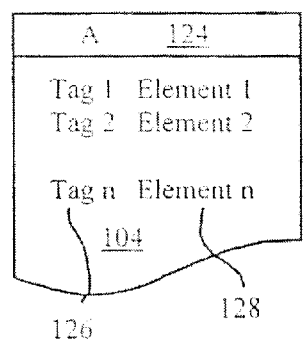
FIG. 1B depicts a block diagram of an exemplary knowledge object for use with the system of FIG. 1.
Figure 1B:
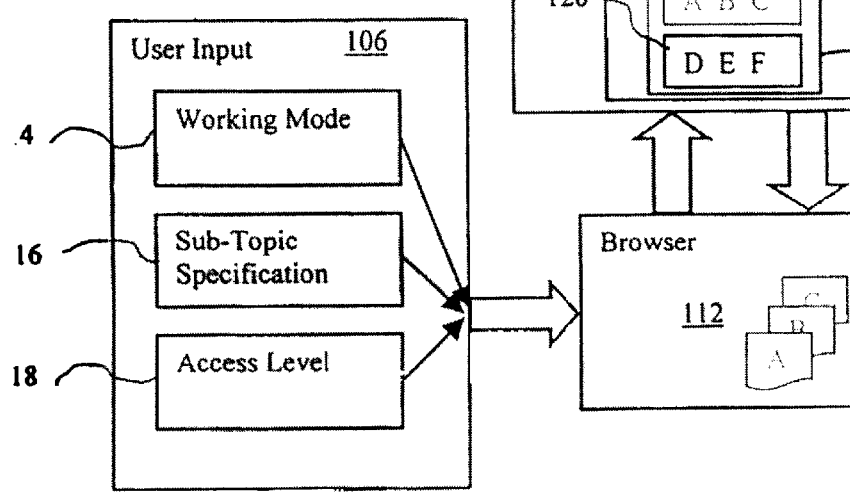

Each knowledge object 104 is an atomic or elemental portion of knowledge within the overall collection of information stored in the knowledge pool 102. Each knowledge object 104 is contained as a separate data file, the knowledge pool 102 being structured as a collection of these data files. In one embodiment, the knowledge object 104 contains, at most, one screen full of knowledge, although more or less information can be contained within a knowledge object 104. Referring to FIG. 1B, in another embodiment, each knowledge object 104 includes a set of one or more atomic or elemental portions 128 of knowledge, also referred to as knowledge elements 128, within the overall collection of information that is stored in the knowledge pool 102. In this embodiment, each set of knowledge elements is contained within a single data file within the collection of data files which make up the knowledge pool 102. Each knowledge element 128 may be associated with program code which controls the presentation of that knowledge element 128 when the knowledge object 104 is presented, as will be described.

Referring back to FIG. 1A, the knowledge contained within a knowledge object 104 is characterized by relevance to one or more particular sub-topics, orientation to one or more particular working modes and appropriateness to one or more particular access levels. In one embodiment, the knowledge object 104 is associated with an identifier 124, such as a file name, which identifies one or more of the relevance to a particular sub-topic, the orientation to a particular working mode or the appropriateness to a particular access level. In another embodiment, the knowledge contained within a knowledge object 104 is further characterized by a language in which the content is composed.

Referring back to FIG. 1B, in an alternate embodiment, the knowledge object 104 may contain one or more knowledge elements 128, as described above, each of which is characterized by the content language, the relevance to one or more particular sub-topics, the orientation to one or more particular working modes and/or the appropriateness to one or more particular access levels. Each knowledge element 128 within the knowledge object 104 is coupled with an identifier 126, such as a tag, which identifies this characterization. Further, the entire knowledge object 104 is coupled with an identifier 124, such as a file name as described above.

Referring back to FIG. 1A, in one embodiment, the knowledge pool 102 is implemented as a hierarchical structure of directories of folders within the file system of the host computer which contains the knowledge object 104 data files, as described above. The top-level folder/directory represents the knowledge pool 102. Within the top-level directory, sub-directories are provided to store knowledge objects 104 for each working mode, Learn, Perform and Browse. Further, a "shared" sub-directory is provided to store knowledge objects 104 that are shared between various working modes as well as among various sub-topics within a working mode. For example, a knowledge object 104 containing an image depicting a transducer may be shared between the spare parts list and the technical descriptions for transducers. Both sub-topics are part of the Browse mode, but cover different subjects/undertakings. Pre-defined file-name and directory name conventions allow the Knowledge Module Identifiers 110, described in more detail below, to select the knowledge objects 104 required for the selected working mode, sub-topic and access level, and optionally, language. For example, the program code and graphic image files which implement the interface to the system 100 may be stored in a directory labeled "interface." The knowledge pool 102 may be stored in a directory labeled "knowledge." Further, the knowledge directory further includes sub-directories labeled "learn," "perform," browse." and "shared" that store the associated knowledge objects 104. Within the directories, the knowledge objects 104 are stored using the pre-defined naming convention. This naming convention is described in more detail below in relation to the knowledge module identifiers 110.

Where a knowledge object 104 includes one or more knowledge elements 128, the identifier tags 128 in conjunction with program code within the knowledge object 104 suppress the irrelevant or inappropriate information from being presented, as will be described below. Various methods of storing and organizing the knowledge pool 102 and constituent knowledge objects 104 may be used. For example, the knowledge pool 102 may be loaded in random access memory and organized using memory addresses. Alternately, a flat file structure may be used for storing the knowledge pool 102. Further, a directory structure of knowledge objects 104 organized by their access level appropriateness and/or sub-topic relevance in addition to the working mode orientation may be used.

Knowledge objects 104 are first categorized by working mode and then by sub-topic and access level. The way knowledge objects 104 are stored. i.e. the physical arrangement, and the logical arrangement of knowledge objects 104, is a function of this categorization. While categorized and stored by working mode, knowledge objects 104 are not restricted to presentation in a specific working mode. For example, Perform working mode oriented knowledge objects 104 may also be appropriately oriented or related for use in the Learn working mode as well, Browse working mode oriented knowledge objects 104 may be suitably oriented or related to be used in Perform working mode, etc. Depending on the knowledge object 104 type, working mode, and the current knowledge module, objects may be presented in the current browser window or in a new window or frame, as will be discussed below.

Based on the working mode orientation, each knowledge object 104, or knowledge element 128 of a knowledge object 104, has an intended or primary working mode. Each may also be secondarily used to assist other knowledge objects 104 which are topically related. The primary or intended use is defined by the knowledge sub-module 120. As will be described below, the knowledge sub-module 120 is a sequenced selection of knowledge objects 104 according to the user selection of working mode, sub-topic and access level. The knowledge sub-module 120 can further include topically related knowledge objects 104 which are not oriented in the currently selected working mode to provide additional assistance to the user. Assisting knowledge objects 104 are presented so as not to interrupt the workflow of the current working mode, such as by presenting these knowledge objects 104 in an alternate display window or frame.

In an alternate embodiment, knowledge objects 104 are first categorized by working mode. Those knowledge objects 104 containing knowledge elements 128 oriented to more than one working mode are categorized as shared. Typically, all of the knowledge elements 128 of a given knowledge object 104 will be oriented to a particular working mode and relevant to a particular sub-topic. However, the knowledge object 104 may contain one or more knowledge elements 128 appropriate to different access levels and composed in different languages. In this embodiment, the directory location and file name 124 of the knowledge object 104 data file identify the working mode and sub-topic of the knowledge object 104. Identifier tags 126 associated with the knowledge elements 128 within the knowledge object 104 identify the access level and language of the particular knowledge element 128. Program code within the knowledge object 104 processes the user's selected access level and language and actively suppresses presentation of knowledge elements 128 identified by their tags 126 as inappropriate or composed in the wrong language, as will be discussed below.

The dynamic presentation manager 108 further includes knowledge module identifiers 110. There is a knowledge module identifier 110 for each working mode. Alternatively, there may be a single knowledge module identifier 110 which handles each working mode. The dynamic presentation manager 108 receives input from the user specifying the user competence/access level and a working mode. This information is passed to the appropriate knowledge module identifier 110 for the selected working mode. The Learn and Browse knowledge module identifiers 110 further receive input from the user specifying a topic and sub-topic of interest to the user.

The Perform working mode knowledge module identifier 110 receives input from the user further specifying a classification of topics and a topic, i.e. a task to perform, within the classification that the user is interested in. For example, the user may choose to perform an installation. Within the Installation classification, they may choose the task of installing a new hard drive. Each sub-task may consist of one or more knowledge objects 104, each showing one or more steps in the sub-task. The task to perform may include a set of one or more sub-topics directed to that task. Typically, tasks within each classification are composed of a set of sub-tasks, each of which is considered a sub-topic. Since all of the sub-tasks typically need to be performed to complete the task, the knowledge module identifier 110 for the Perform working mode automatically selects all of the sub-topics for a given task rather than allow the user to pick and choose sub-topics as is allowed by the Learn and Browse knowledge module identifiers. For example the task for installing the new hard drive may consist of several sub-tasks such as removing a panel, inserting the new drive, and replacing the panel, all of which need to be performed to accomplish the task. By automatically selecting the correct sub-task/sub-topics given the classification and task to perform, the user need not figure out which sub-topics/sub-tasks they need to view to accomplish the general task. Classifications include "Install," "Maintain," "Troubleshoot," and "Replace" which are general categories of tasks that can be performed. The Learn and Browse modes allow the user to select the particular sub-task/sub-topic they are interested in learning about or browsing. For example, if the user wishes to learn about removing the panel only, they may select that sub-topic without having to view all of the sub-topics involved with installing a new hard drive. In an alternate embodiment, the Perform working mode knowledge module identifier 110 is the same as the Learn and Browse working modes knowledge module identifiers 110 and allows the user to pick and choose any of the sub-topics within the working mode.

Each of the access level, working mode and classification/topic or sub-topic are separately specified by the user. In another embodiment, the specification of the access level, working mode and/or classification/topic or sub-topic may be combined and specified with one specification such as in an encoded form. In this embodiment, the knowledge module identifiers 110 establish the values of the access level, working mode and/or classification/topic or sub-topic from this combined specification. For example, a single command may invoke the novice access level in the Learn working mode which then presents particular sub-topics to choose from as described below. In an alternate embodiment, the knowledge module identifiers 110 receive only a subset of the access level, working mode or sub-topic. Wherein one or more of the access level, working mode or sub-topic is unspecified, the knowledge module identifiers 110 establish the missing specification using default or previously stored values. Further, in yet another alternate embodiment, one or more access levels, one or more of the working modes and/or one or more of the sub-topics may be unavailable or locked out from being specified. For example, the system 100 may be programmed to allow only novice access to any sub-topics within the Perform working mode only. The knowledge module identifiers 110 identify one or more knowledge objects 104 within the knowledge pool 102 which meet with the users (or default) specifications and which fulfill the performance requirements of the defined classification/topic or sub-topic.

The identities of the selected knowledge objects 104 and their sequence is collectively called a "knowledge sub-module" 120. A knowledge sub-module 120 is a sequenced collection of knowledge objects 104 related to a particular sub-topic, i.e. lesson, task or subject, oriented to a particular working mode and appropriate to a particular access level. A knowledge sub-module 120, or knowledge object 104 within the currently selected sub-module 120, may further specify other knowledge objects 104 to be displayed for their secondary use to assist the user. For example, where a knowledge sub-module 120 relates to the performance of a remote service task, a link to another knowledge object 104 explaining how to set up remote service communications may be provided. In another example, where a secondary knowledge object 104 relates to the content contained within a sub-set of the knowledge objects 104 in the current sub-module 120, only those related knowledge objects 104 within the subset need refer to, and cause presentation of, the secondary knowledge object 104, thereby presenting this secondary information only where necessary.

A knowledge module 122 includes a set of one or more knowledge sub-modules 120 which are topically related.

The knowledge module 122 is generally referred to as a topic. Knowledge sub-modules 120 and knowledge modules 122 are pre-defined by the author of the content of the system 100 and programmed into the knowledge module identifiers 110. In particular, a given sub-topic, i.e. lesson, task or subject, is generally specified by the combination of the knowledge module 122 which defines the topic to which the lesson, task or subject is related and knowledge sub-module 120, which defines the specific subject matter of the lesson, task or subject.

Based on the access level and working mode, the knowledge module identifiers 110 identify one or more knowledge modules 122 and one or more knowledge sub-modules 120 oriented to the working mode and appropriate to the access level. The knowledge module identifiers 110 further account for the selected language to identify those knowledge modules 122 and knowledge sub-modules 120 further composed in the requisite language.

Given the access level and working mode and, in the case of the Perform mode the classification, the knowledge module identifiers 110 determine the appropriate knowledge modules 122 and knowledge sub-modules 120 to present to the user and identify them to the dynamic presentation manager 108. The knowledge module identifiers 110 are pre-programmed with the appropriate knowledge modules 122 and knowledge sub-modules 120 for the given working mode and access level and classification.

The user is then permitted to select one or more knowledge modules 122 which they wish to perform. The user may select any combination of the available knowledge modules 122. The knowledge modules identifier 110 then dynamically sequences the selected knowledge modules 122 in an order appropriate to perform all of the selected tasks. In an alternate embodiment, the user may select the order they wish to perform each task contained within each knowledge module 122. The knowledge module identifier 110 for the Perform working mode contains a two-dimensional array of all of the available knowledge modules 122 along with a unique sequence identifier, i.e. integer number, for each. The sequence identifier is pre-defined by the author of the content and represents the overall ordering of the knowledge modules 122. The lower the sequence identifier, the higher the priority in the ordering. The knowledge module identifier 110 looks up each selected knowledge module 122 and determines its sequence identifier. The selected knowledge modules 122 and their corresponding knowledge sub-modules 120 are then sequenced numerically using their corresponding sequence identifiers. Alternatively, other organizational structures may be used to appropriately sequence multiple tasks together.

Each knowledge module 122 consists of one or more knowledge sub-modules 120 as described. Further, one or more knowledge sub-modules 120 may be shared among two or more knowledge modules 122. When the user selects two or more knowledge modules 122, there is a chance that both knowledge modules 122 will contain common sub-modules 120. To avoid confusing the user, it is preferred to remove the redundant knowledge sub-modules 120.

After the knowledge modules 122 and their corresponding knowledge sub-modules are sequenced, they are scanned to remove redundant sub-modules 122. Each knowledge sub-module 120 is categorized as an Install, Remove or Unique knowledge sub-modules 120. For Remove knowledge sub-modules 120, the first occurrence of the knowledge sub-module 120 is kept and subsequent occurrences of that same knowledge sub-module are removed from the selected knowledge sub-modules 120 of the selected knowledge modules 122. For Install knowledge sub-modules 120, the last occurrence of the knowledge sub-module 120 is kept and all prior occurrences of that same knowledge sub-module 120 are removed. Unique knowledge sub-modules 120 are not checked for redundancy. The categorization of Install, Remove or Unique is reflected in the title of the knowledge sub-module 120 as stored in the knowledge module identifier 110, as described below.

For example, if a user selects one knowledge module 122 which relates to how to remove an internal part and includes a knowledge sub-module 120 which shows how to remove a panel, and second knowledge module 122 which relates to how to remove a second internal part and which includes the same knowledge sub-module 120 about removing the panel, the redundant knowledge sub-module 120 will be suppressed as it is unnecessary to remove the panel again once it has been removed the first time Similarly, redundant knowledge sub-module 120 relating to replacing the panel will also be suppressed. This reflects the logical sequence that the panel must be removed only once before both parts can be removed.

Further, the identifiers of the knowledge objects 104 may also include a sequence identifier identifying their presentation sequence to the knowledge module identifiers 110 within each sub-module 120. This sequence identifier relates various knowledge objects 104 together in a pre-defined order set by the administrator/developer/author of the content of the system 100. Where multiple knowledge objects 104 are identified for the performance of a certain sub-task, the knowledge objects 104 are sequenced in an order appropriate for completing the sub-task.

In an alternate embodiment, the identifiers of the knowledge objects 104 further include a redundancy identifier to permit redundancy checking between selected knowledge objects 104 of one or more sub-modules 120. The knowledge module identifiers 110, if necessary, further suppress presentation of redundant knowledge objects 104 between two or more sub-modules 120 selected for sequential presentation. This redundancy identifier identifies knowledge objects 104 which may be referenced by more than one knowledge sub-module 120. For example, if a user selects one knowledge sub-module 120 which relates to how to remove an internal part and includes a knowledge object 104 which shows how to remove a particular screw, and second knowledge sub-module 120 which relates to how to remove a second internal part and which includes the same knowledge object 104 about removing the screw, the redundant knowledge object 104 will be suppressed as it is unnecessary to remove the screw again once it has been removed the first time. Similarly, redundant knowledge objects 104 relating to replacing the screw will also be suppressed. This reflects the logical sequence that the panel must be removed only once before both parts can be removed.

In one embodiment, the determined knowledge modules 122 and, in the case of the Learn or Browse working modes, knowledge sub-modules 120 are presented to the user for selection in a hierarchical format such as in a menu tree or other hierarchical GUI structure. In Learn or Browse mode, a user's selection of a particular knowledge module 122 causes the display of the knowledge sub-modules 120 topically related to the topic of the selected knowledge module 122. Further selection of a knowledge sub-module 120 causes the dynamic presentation manager 108 to retrieve and begin displaying the sequence of knowledge objects 104 defined by the knowledge sub-module 120. In Perform mode, the user's selection of a particular knowledge module 122 causes automatic selection of the requisite knowledge sub-modules 120, retrieval and display by the dynamic presentation manager 108. The knowledge contained within the selected knowledge objects 104, in the appropriate sequence, is then presented to the user by the dynamic presentation manager 108.

A user interacts with the dynamic presentation manager 108 using a browser program such as Internet Explorer version 5.0, manufactured by Microsoft Corporation or Netscape Navigator, manufactured by Netscape Communications Corporation, located in Mountain View, Calif. Other browser programs or proprietary viewer programs may be used. In one embodiment, the browser program is executing on a computer system having a Pentium or similar class processor running Windows 98, second edition or later version, at least 32 megabytes of RAM, at least 650 megabytes for the system 100 (in addition to necessary storage space for the operating system), a CD-ROM drive to load the system 100 or access to the system 100 via a network. The computer should preferably further include input/output devices, such as a keyboard, mouse and display. Alternatively, other input/output devices, such as a mouse, trackball, touch-pad, touch screen, pointing stick, key pad, audio output, printer, or other user input/output devices may be used. The display preferably has the capability of generating and displaying graphics at a resolution of at least 640×480 at an 8 bit color depth. Alternatively, other resolutions and color depths, such as black and white or gray-scale capability may also be used. In an alternate embodiment, the browser program is executing on an ultrasound system having similar capabilities as described above. Alternatively, other wired or wireless devices, such as personal digital assistants, may be used to access the system 100.

The dynamic presentation manager 108 displays a graphic user interface ("GUI") via the browser, either using HTML, XML, JavaScript/Java Applets or other public or proprietary mark-up or other information display format. In one embodiment, the dynamic presentation manager 108 contains an HTML server. In an alternative embodiment, the dynamic presentation manager 108 contains an XML server. The GUI provides an interactive interface to the user via the input/output devices of the host computer. The GUI includes graphic buttons, pull down menus, pick lists dialog boxes, mouse-overs or other known GUI elements, or combinations thereof for accepting user input from the input devices and presenting information via the browser on the output devices. The GUI further provides a display area, which displays the content provided by the dynamic presentation manager 108 consisting of the information contained within one or more knowledge modules 122 and their constituent knowledge sub-modules 120 and knowledge objects 104.

Typically, the user will have a certain sub-topic, i.e., a specific undertaking that they wish to learn about, perform or browse. To utilize the system, the user accesses the dynamic presentation manager 108, via the browser 112, and specifies their competence or proficiency access level 118, the working mode or mode of access 114, and the classification/topic or sub-topic 116 they are undertaking or wish to learn about. The user may also specify the presentation language.

Various screen displays which present options to the user and receive selections from the user may be utilized to implement this functionality. As described below, the dynamic presentation manager 108 may be accessed on a locally available media such as a local hard disk or CD-ROM or may be located on a network server and accessed via a known uniform resource locator ("URL") or other method of network access. In one embodiment, links are provided to a software program called Syngo® developed by Siemens AG, located in Erlangen, Germany. Syngo® is a software package used in conjunction with medical imaging systems manufactured by Siemens to provide a simplified and unified operational interface to a heterogeneous mix of medical imaging equipment. Syngo® consists of two parts: the first part includes user features related to systems operation, and the second part addresses service personnel needs (troubleshooting the systems, running system tests, setting up remote access, etc.). The adaptive performance system 100 can be accessed/run through a hyperlink provided in the Syngo® service software. For example, an adaptive performance system CD-ROM may be inserted into the ultrasound system's CD drive, or may be otherwise available such as by a remote connection to the adaptive performance system 100 through a corporate intranet or the Internet.

The specification of the user's level of competence or proficiency, collectively the access level 118, allows the user to specify how knowledgeable they are about the particular sub-topic they have selected to learn about or perform. The system 100 presents information relevant to the specified sub-topic and appropriate to this specified proficiency level. In one embodiment, the proficiency level is specified as either novice, intermediate or advanced. Alternately, the proficiency level may be specified as range from novice to advanced having multiple levels of proficiency in between, such as with a numeric scale. By presenting information at an appropriate proficiency level, users are provided the necessary amount of detail. Advanced users do not have to wade through unnecessary introductory detail and novice users are not presented with overly complex information, which they may or may not understand. In an alternate embodiment, the access level specifies a desired proficiency level that controls the sub-topics which are made available to the user for viewing. For example, if the user specifies a proficiency level of novice, then the dynamic presentation manager will only display sub-topics which are appropriate for a novice user. In this way, even an advanced user can control the level of complexity and/or detail of the information they want to view. In one embodiment, specification of a particular access level allows the display of sub-topics appropriate to that access level only. In an alternate embodiment, a particular access level allows viewing of sub-topics appropriate to the specified access level or more junior levels.

The working mode or mode of access/access mode 114 defines the way or format in which the desired information will be presented to the user. The working mode 114 includes a Learn mode, a Perform mode and a Browse mode. Depending on the working mode 114, the information will be presented in a way, or with a format, that best implements what the user is trying to do, e.g. learn a lesson, perform a task, or freely browse information about a subject.

The Learn mode presents information oriented in a tutorial fashion such as a lesson. This may include a displayed lecture, explanatory descriptions or illustrations or background information coupled with an evaluation such as a quiz or an examination. Learn mode focuses on teaching the user about the desired sub-topic. For example, the user may specify that they wish to learn about performing an image quality test on an ultrasound machine. The Learn mode presents information in a format designed to teach the user how to perform such a test, why the test is needed, what the test actually accomplishes and other relevant knowledge.

Knowledge objects 104 selected for the specified sub-topic and oriented towards the Learn mode may further contain links, as described above, to other resources such as live instructors or training personnel via chat rooms or other communications medium, or on-line learning systems, such as web sites, which provide training in subject matter pre-requisite to the specified sub-topic or have updated training materials.

Further, the Learn mode may also include an evaluation function to determine how well the user has learned the subject and gauges their proficiency level. This evaluation function may be contained within one or more knowledge objects 104 or provided by an external resource that is linked from within a knowledge object 104 as described above. These evaluations may take the form of periodic topical or comprehensive quizzes or examinations and may either result in a raw score or a pass/fail indication. In one embodiment, the evaluated proficiency level is automatically utilized to specify the access level 118, as described above, for the other working modes. In another embodiment, the Learn mode automatically starts at the lowest/least difficult access level, or alternatively, at the last access level used by the user in a prior session, and progressively evaluates the user to automatically set the access level for the current session for the other working modes. As a user progresses and successfully demonstrates competency at a particular access level, that level is stored to allow the user to automatically start at that level in future sessions. In yet another embodiment, the Learn mode further provides a certification function, either directly or via a link to an external resource as described above, which certifies a user's comprehension of the subject matter presented and issues/prints an accreditation, such as a certificate, acknowledging the user's proficiency. Alternatively, or in conjunction with the issuance of an accreditation, the system 100 may automatically report, via a network or other communications method, this certification to a central repository that tracks the user's progress.

The Perform working mode presents information oriented in a guided or directional format, i.e. oriented to the task or undertaking and the constituent steps thereof. This may include step-by-step instructions, diagrams or other information oriented toward assisting and/or guiding the user through performance of the desired task. In one embodiment, the Perform mode checks if the user has accessed the same topic or sub-topic in the Learn mode and has been successfully evaluated, and the elapsed time since that access and evaluation. The Perform mode may then require and/or suggest that the user complete an associated tutorial in the Learn mode prior to providing performance oriented instruction. In another embodiment, the Perform mode maintains service schedules and maintenance records for particular products and/or processes and tracks which tasks have been completed according to these schedules. These schedules and records may be maintained locally or on a remote system via a network. When a scheduled or planned maintenance is due, the system 100 automatically reminds the user to perform the maintenance and automatically specifies the task and working mode to assist the user.

Many tasks are often complicated and comprise several smaller tasks or sub-tasks. Each sub-task may further comprise several steps to complete. The Perform working mode automates the selection of tasks so that the user does not have to manually select all of the sub-tasks for a given task. The Perform mode further allows the selection of multiple tasks, automatically sequences those tasks in a proper order and removes redundant sub-tasks. The Perform working mode classifies the tasks as installation, maintenance, troubleshooting or replacement tasks. Alternately, other classifications may be used in addition or in place of these classifications. Troubleshooting tasks, for example, may include tasks for diagnosing defects and malfunctions within the associated product or process, whether latent, patent or user induced.

Knowledge objects 104 within each sub-task/sub-topic may contain links to external resources to assist with the performance of the sub-task or task. For example, knowledge objects 104 relevant to troubleshooting may contain links to external resources such as knowledge databases, live service engineers, as well as parts inventory and ordering systems. For example, a relevant knowledge object 104 may contain a link to an Uptime Center, also known as a local call center, which provides technical support to field service engineers and consists of subject matter experts who provide solutions to technical problems related to particular products. Further, knowledge objects 104 may be provided that contain applications for generating service tickets. In one embodiment for use with a remotely controllable product, a knowledge object 104 capable of interfacing with that remotely controllable product and operating diagnostic routines is provided. The results of the routines are then presented to the user and/or automatically included in any generated reports.

The Browse mode presents information in a topical, browsable and/or searchable form, which allows the user to locate desired information in a free form/search and retrieve format. Knowledge objects 104 may be retrieved specifically oriented towards the Browse working mode or may be oriented to the Learn or Perform working modes. The retrieved knowledge objects 104 may have any of the capabilities detailed above, including the ability to link the user to resources external to the system 100 or to provide evaluations. For example, a knowledge object 104 may contain a link to a web site or network server for product updates or for revisions to the system 100 itself, such as updated knowledge objects 104 or updates to the other components of the system 100. In one embodiment, a knowledge object 104 may contain a link to a Speed Info™ service bulletin. A Speed Info™ service bulletin is one type of service bulletin published by one particular manufacturer of ultrasound systems to inform service personnel about new products, product updates, spare parts, product features, etc.

The sub-topic specification 116 permits the user to define/specify the particular sub-topic or undertaking that they are interested in. This may be implemented in a list format which allows the user to select from the list. For example, the user may specify that they are interested in performing or learning to perform an image quality test for an ultrasound system. The system 100 will only present information relevant to this sub-topic, eliminating extraneous information.

In the Perform working mode, the user may specify more than one task to perform where they may have to perform several tasks in a row. For example, the tasks/topics of a given classification may be presented in a list format with check boxes next to each which allow the user to make one or more selections. The topics/tasks and/or sub-tasks/sub-topics may or may not be related. The system 100 retrieves the appropriate information and sequences that information in an appropriate manner allowing the user to streamline the performance process by stringing tasks together in one operation. Where a user strings together related tasks/topics, the system 100 automatically sequences the sub-topics in a logical order and then removes redundant sub-topics. In alternate embodiment this functionality is available in Learn and/or Browse working modes as well, allowing the stringing together of lessons and/or subjects.

The system 100 may further provide the ability to interact with more than one user such as by requiring a login name and password. Any bookmarks, annotations, preference settings, prior access levels, prior working modes, etc. are associated with that user and stored separately from those of another user. In one embodiment, the system 100 tracks the elapsed time since a user has been certified in a particular task. When the elapsed time exceeds a pre-defined threshold, the user is notified that they should return to the Learn working mode to be re-evaluated for re-certification. Similarly, if a particular user fails to access a particular task within the Perform working mode for a pre-defined period of time, indicating that they have not performed that particular task lately or routinely, the system 100 may require and/or suggest that the user return to the Learn mode to refresh their skills.

Figure 2A:
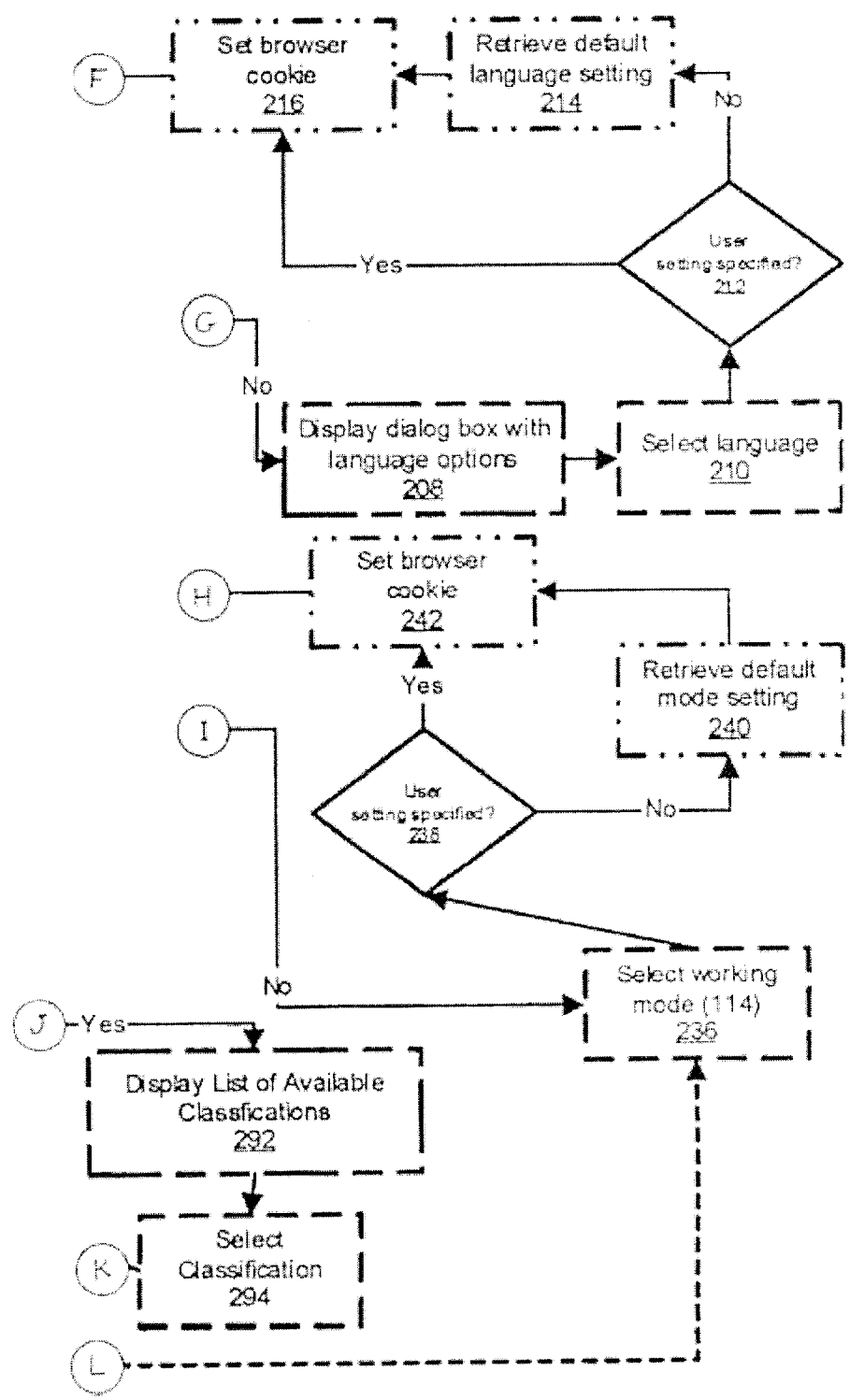
Figure 2A:
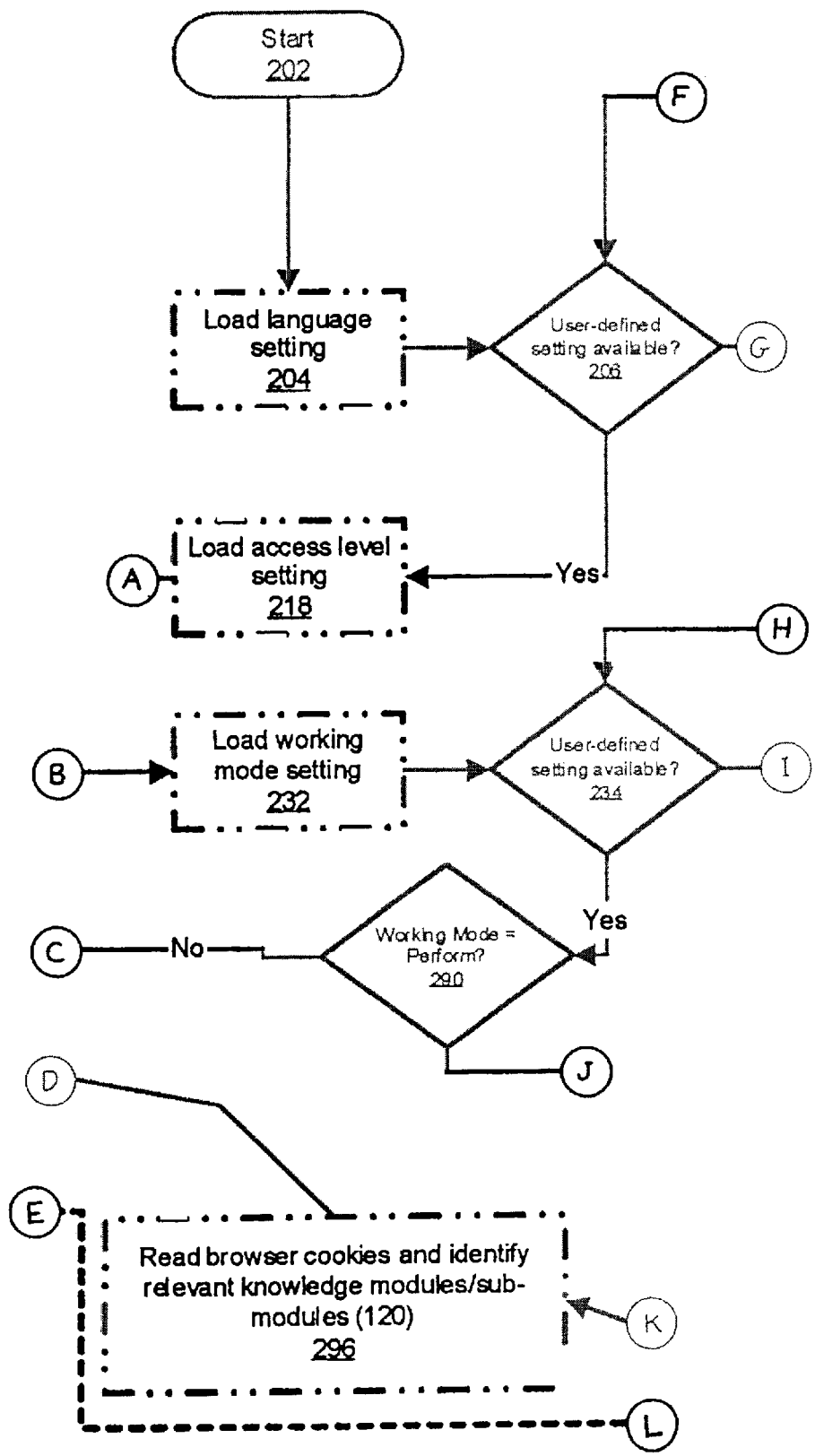
Figure 2A:
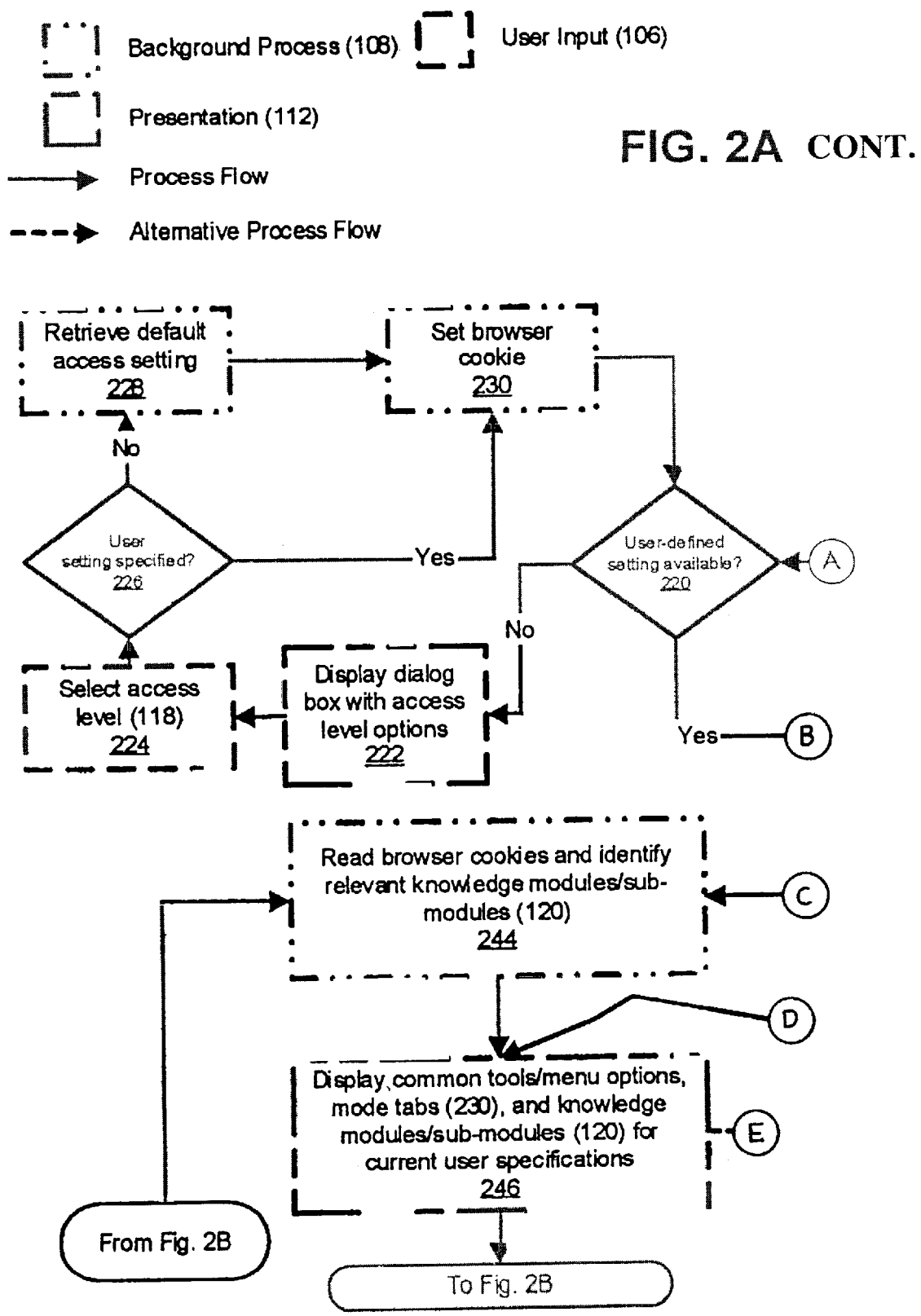
Figure 2B:
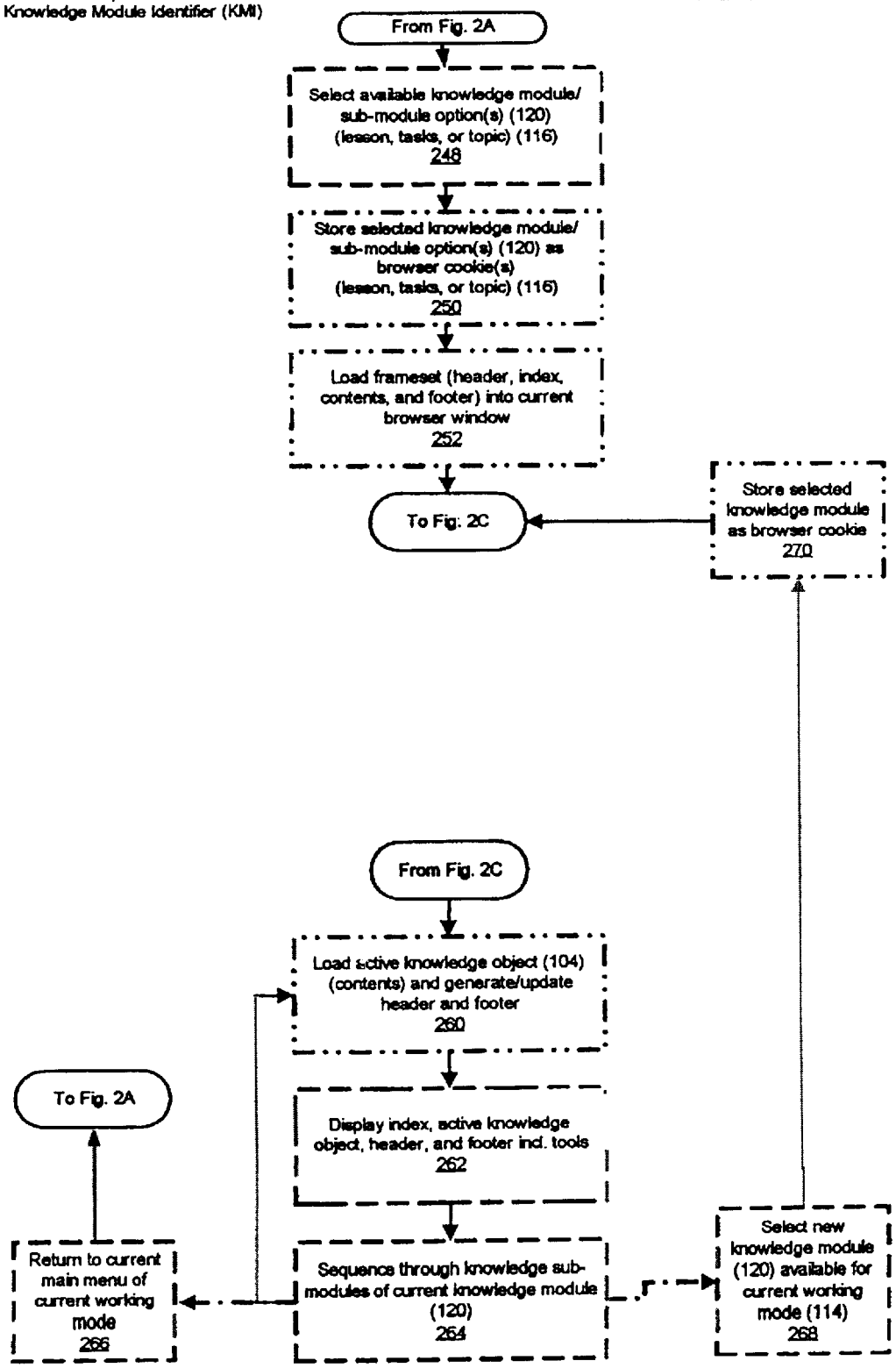

FIGS. 2A–2C show a flow chart depicting exemplary operation of the system 100. At startup (202), the system 100 loads defaults or user-defined settings from the previous session and presents a title or introductory screen. In one embodiment, the system 100 is capable of being used by multiple users and the user is asked to identify themselves, such as with a log-in. The system 100 first loads a user-saved language setting (204). If a user-saved language setting is not available (206) indicating that the user has not set a language or has erased the setting, the system 100 presents a dialog box with language options (208). The user then selects a language (210). If the user fails to specify a language (212), a default language is set (214). A browser cookie is set with the language setting (216). As described above, a browser cookie is a client side persistent data structure stored by the browser for the system 100. This browser cookie is set so as not to expire after the user closes their session with the system 100. The cookie will persist and be available the next time the user executes the system 100. The system 100 then checks again for a user-saved setting (206) by looking for the cookie. Since a language setting cookie was either saved or created, control moves on to load the access level setting (218).

The system 100 next loads a user or system-saved access level setting (218). If a saved access level setting is not available (220) indicating that the user or system has not set an access level or has erased the setting, the system 100 presents a dialog box with access level options (222). The user then selects an access level appropriate to the user's proficiency (224), e.g. novice, intermediate or advanced, as described above. If the user fails to specify an access level (226), a default access level is set (228). A second browser cookie is set with the access level setting (230). This browser cookie is set so as not to expire after the user closes their session with the system 100. Alternately, the first browser cookie may be modified to reflect both the language and access level settings. The system 100 then checks again for a user-saved access level (220) by looking for the cookie. Since an access level setting cookie was either saved or created, control moves on to load the working mode setting (232). As was described above, in alternate embodiments, the setting of the access level may be automatically performed by the Learn mode based on previous evaluations of the user.

The title screen is replaced with a working mode options screen, described in more detail below, and the system 100 attempts to load a user saved working mode setting (232). If a saved working mode setting is not available (234), the user may select a working mode from the presented options, such as Learn, Perform, or Browse as described above (236). If the user fails to specify a working mode (238), a default working mode is set (240). A third browser cookie is set with the working mode setting (242). This browser cookie is set so as not to expire after the user closes their session with the system 100. Alternately, the first browser cookie may be modified to reflect the working mode and other settings. The system 100 then checks again for a user-saved working mode (234) by looking for the cookie. Since a working mode setting cookie was either saved or created, control is passed to the dynamic presentation manager, described in more detail below.

If the working mode was set to Learn or Browse (290), then the working mode options screen displays a header with useful links to information about the system 100, and a footer containing a basic set of tool icons which link to associated tool functions. The following tools are available: Exit the System 100 which quits the system 100 and returns the user to the computer's operating system; Return to User Defined or Default Startup which reverts the system 100 settings to user defined or system default values and restarts the system 100; Search for Information which allows a user to perform a search of the knowledge pool 102 using keyword, Boolean, natural language search methods or combinations thereof; Print Information which allows the user print out the currently displayed knowledge object's 104 contents; Edit Teknotes which allows the user to enter or view personal notes; View Glossary which allows a user to view and search a glossary of terminology related to the knowledge stored in the knowledge pool 102; and Set/View Bookmarks, which allow the user to set annotated markers within the content for subsequent quick return to that content in a later session. Different, fewer or additional tools may be provided. In one embodiment, the user is able to access a set-up menu to set default system 100 operational settings.

When the user selects the Return to Default Startup option, the system 100 reverts to these user defined settings, otherwise, if they are not defined, the system 100 reverts to manufacturer defined default settings. In addition, some subjects/knowledge objects 104 enable the Help and/or Info icons, which allow the user to view help or additional information available for a subject. Knowledge objects 104 available through the Info icon are secondary ("assisting") knowledge objects 104. The screen also displays the working mode options (230), Learn, Perform and Browse. The working mode options are displayed as mode tabs which are selectable links which appear as graphical tab separators to indicate the mutually exclusive distinction among the available working modes. The user selection of a desired working mode, visually excludes the other working modes. In one embodiment, the access level and working mode are toggled operators which can be set in any order. As the user toggles these operators non-sequentially, the system 100 responds appropriately. In an alternate embodiment, the user interface may present each setting in a sequential order, for example, requiring the user to choose an access level prior to choosing a working mode.

Once the language, access level and working mode are set, control is passed to the dynamic presentation manager 108 which reads these settings from the cookies (244). Alternately, these settings may be passed to the dynamic presentation manager 108 using register or memory locations as are known. The dynamic presentation manager further executes the knowledge module identifier 110 for the current working mode which identifies all of the knowledge modules 122 and sub-modules 120 available for the current access level and working mode.

If the working mode is set to Perform (290), the dynamic presentation manager 108 displays the working mode options screen with the header and a footer as described above. The dynamic presentation manager 108 executes the knowledge module identifier 110 for the Perform working mode which displays a list of available task classifications, such as Install, Maintain, Troubleshoot and Replace. The user may then select the classification of the task they are interested in performing (294). Once the user has selected a classification, the knowledge module identifier 110 identifies all of the knowledge modules 122 and sub-modules 120 available for the current access level and working mode and within the selected classification (296).

The dynamic presentation manager 108 presents these knowledge modules 122 and sub-modules 120 (sub-modules 120 are not listed in Perform mode) to the user for selection along with the tools/icons listed above (246). At this point, the user may then choose to change the working mode as described above (236). This will trigger the routine described above and cause the dynamic presentation manager 108 to re-execute the knowledge module identifier 110 of the new working mode and display the associated knowledge modules 122 and sub-modules 120 for that mode.

The user then selects one or more knowledge modules 122 and, if in Learn or Browse mode, sub-modules 120 from the list representing the topic and sub-topic they are interested in (248). Identifiers of the selected, i.e. active knowledge modules 122 and sub-modules 120 are stored as a browser cookie, as described above, which is set to expire when the current session is ended (250). In an alternate embodiment, this cookie may be set so as not to expire to allow the user to resume a previously interrupted session. The dynamic presentation manager 108 then loads and displays a frameset in the current display window consisting of header, index, contents and footer frames (252). It will be appreciated that a non-framed display format may also be used, such as a multi-window display or multi-layer display, implemented, for example, with dynamic HTML.

The header frame displays a location reference header specifying the current working mode, knowledge module 122 title, knowledge sub-module 120 title, and the relative number of the current display page within the current knowledge sub-module 120 and the absolute number of the current display page within the current knowledge module 122. The relative number of the current display page reflects the sequence position of the knowledge object 104 within the knowledge sub-module 120 while the absolute number reflects the sequence position within the knowledge module 122. The index frame displays a link to the main menu of the current working mode and a list of available knowledge modules 122 for the currently active working mode 114. In addition, the index shows all available knowledge sub-modules 120 for the currently selected (active) knowledge module 122. The main presentation or contents frame is used for the presentation of the selected knowledge sub-module 120, made up of the content of one or more knowledge objects 104. The footer contains tool icons. The tools include a basic set common to all screens and tools that are active for the current mode, module 122/sub-module 120, and page, i.e. knowledge object 104, described above.

The stored browser cookies identifying the access level, the working mode and the selected/active knowledge modules 122 and sub-modules 120 are then loaded (254). If the working mode is set to Learn or Browse (272), the corresponding knowledge module identifier 110 is executed and loads the relevant cookies (274). The cookie for the active knowledge module 122 is read. All available relevant knowledge modules 122 are identified for the active working mode (278). The knowledge module identifier 110 then identifies the knowledge sub-modules 120 associated with the active knowledge module 122.

If the working mode is set to Perform (272), the dynamic presentation manager 108 reads the cookie values for the selected tasks, i.e. knowledge modules 122, classification and the active knowledge module 122, i.e., the first one selected (280). The knowledge module identifier 110 is then executed and the relevant cookie values are passed (282). The relevant knowledge sub-modules 120 for each selected knowledge module 122 are then identified (284). The knowledge module identifier 110 then dynamically sequences the selected knowledge modules in an appropriate order (286). This allows the user to select any combination of available knowledge modules 122 and permits the appropriate sequencing of those selected knowledge modules 122. The knowledge module identifier 110 contains a two-dimensional array of all of the titles of the knowledge modules 122 along with a corresponding sequence identifier. The sequence identifier, i.e. an integer number, for each knowledge module 122 is pre-defined by the content author and identifies the priority ordering of that knowledge module 122 within all of the other knowledge modules 122 of the selected classification. The lower the sequence identifier, the higher the priority for the corresponding knowledge module 122. The knowledge module identifier 110 determines the sequence identifier for each selected knowledge module 122 and sequences the selected knowledge modules 122 in that order. Alternately, other organizational structures may be used to appropriately sequence selected tasks/knowledge modules 122.

Once the selected knowledge modules 122 are sorted, the knowledge module identifier 110 identifies all of the knowledge sub-modules 120 in each of the selected knowledge modules 122 (287). Redundant knowledge sub-modules 120 are then removed (288). As was described, two or more knowledge modules 122 may share knowledge sub-modules 120. When the user selects these knowledge modules 122, the redundant knowledge sub-module should be removed to avoid confusing the user, e.g. the user might be instructed to remove the same part twice. Knowledge sub-modules 120 for the perform working mode are categorized as install, remove or unique knowledge sub-modules 120. This categorization is reflected in the knowledge sub-module 120 title as stored in the knowledge module identifier 110, and described below. The sequenced knowledge modules 122 and their corresponding sub-modules 120 are listed in an array. The array is scanned from the first knowledge module to be presented to the last. For remove knowledge sub-modules 120, the first occurrence is kept and subsequent occurrences of identical knowledge sub-modules 120 are removed as redundant. For install knowledge sub-modules 120, the last occurrence is kept and all prior identical knowledge sub-modules 120 are removed. Unique knowledge sub-modules 120 are not checked for redundancy. In this way, for example, parts that are removed are not removed again, and parts that are to be installed are only installed once.

For example, the replacement of items 1, 2 and 3 may require removing and re-installing item X within each replacement procedure. According to the pre-defined sequence in the knowledge module identifier 110, item 2 is supposed to be replaced before items 1 and 3.

The actual procedures (and associated sub-procedures) before sorting and checking for redundancy may look as follows:

1. Replacing item 1. (This is the knowledge module 122 level)
    1.1 Remove item X. (This is the knowledge sub-module 120 level)
    1.2 Remove old item 1.
    1.3 Install new item 1.
    1.4 Install item X.
2. Replacing item 2.
    2.1 Remove item X.
    2.2 Remove old item 2.
    2.3 Install new item 2.
    2.4 Install item X.
3. Replacing item 3.
    3.1 Remove item X.
    3.2 Remove old item 3.
    3.3 Install new item 3.
    3.4 Install item X.

After sorting the procedures the sequence looks as follows:
1. Replacing item 2.
    1.1 Remove item X.
    1.2 Remove old item 2.
    1.3 Install new item 2.
    1.4 Install item X.
2. Replacing item 1.
    2.1 Remove item X.
    2.2 Remove old item 1.
    2.3 Install new item 1.
    2.4 Install item X.
3. Replacing item 3.
    3.1 Remove item X.
    3.2 Remove old item 3.
    3.3 Install new item 3.
    3.4 Install item X.

Checking for redundant sub-procedures (knowledge sub-modules) results in the following modified procedures:
1. Replacing item 2.
    1.1 Remove item X.
    1.2 Remove old item 2.
    1.3 Install new item 2.
2. Replacing item 1.
    2.1 Remove old item 1.
    2.2 Install new item 1.
3. Replacing item 3.
    3.1 Remove old item 3
    3.2 Install new item 3.
    3.3 Install item X.

All subsequent instructions (after the first appearance) to remove item X have been eliminated. All instructions but the last one to install item X have been also eliminated. Each sub-procedure appears only once.

The selected/active knowledge sub-modules 120 are then processed to determine the relevant knowledge objects 104 (256) and their sequence, as described above. In an alternate embodiment, redundant knowledge objects 104 are suppressed, as described above. An index of the relevant knowledge modules 122 and knowledge sub-modules 120 for the currently active knowledge module 120 is then assembled (258) and created (259). In one embodiment, the index is displayed for a user to select a knowledge module 122 (or sub-module 120 for the currently selected/active knowledge module 122) to view. Directional control options are provided in the footer frame to allow the user to move forward or backward through the sequence of knowledge objects 104.

The active knowledge object 104 is then loaded into the contents frame and the header frame is updated with the title of the current knowledge module 122 and sub-module 120 and an indicator of the position of this knowledge object 104, as described above (260). The footer frame displays all common tool icons and the enabled or disabled help, info and directional control icons. The contents and other frames are then displayed along with the index (262). The first knowledge object 104 displayed is the first knowledge object 104 in the sequence as identified by the knowledge sub-module 120. The user is then able to sequence through the available knowledge objects 104 of the selected sub-modules 120 (264) which cause each sequential knowledge object 104 to be loaded (260) and displayed (262) as described above.

At any time, or once the user has completed viewing all of the knowledge objects 104, they may return to the main menu (266). Alternately, they may select a new knowledge module 122, and then sub-module 120 of the selected knowledge module 122 (268). Selection of a new knowledge module 122 and sub-module 120 causes those settings to be stored as a session limited browser cookie, as described above (270) and the display process begins again (254).

Once the user selects a working mode, knowledge module 122, and knowledge sub-module 120, this information is stored as one or more cookies. The adaptive performance system 100 loads the frameset (index, header, contents, footer) into the current browser window. The file loaded into the INDEX frame reads the preciously stored cookie values. Then the respective Knowledge Module Identifier 110 JavaScript is loaded. The Knowledge Module Identifier 110 JavaScript is a function that receives the setting for the active knowledge module 122. For the Perform working mode, additional information is passed to the Knowledge Module Identifier 110 such as the classification of selected knowledge modules 122, which in one embodiment includes Install, Maintain, Troubleshoot, or Replace. The knowledge module identifiers 110 know which sub-modules 120 are associated with each knowledge module 122 and the user does not need to provide this input. In addition, for Perform mode, a knowledge module 122 contains a task/procedure, i.e., "Replacing the Hard Disk Drive." which the user selects. The Perform working mode knowledge module identifier 110 automatically picks the sub-procedures, or sub-modules 122, that are required, such as "Remove the Upper Panels," "Remove the old drive," "Install the new drive." "Install the Upper Panels". For Perform mode, the list of knowledge modules 122 presented in the INDEX frame varies compared to the fixed list of knowledge modules 122 and sub-modules 120 available for the Browse and Learn working modes. The user may be presented the entire list of knowledge modules 122/sub-modules 120 or a subset depending upon the selected working mode. When operating in Perform mode the user may be presented with a subset of available knowledge modules/sub-modules 122, 120 while for Learn and Browse mode the user is always presented the full list of knowledge modules 122 in the INDEX frame.

As was discussed, in one embodiment, there is one Knowledge Module Identifier 110 file for each working mode. In an alternate embodiment, one Knowledge Module Identifier 110 file is used for all working modes. Each Knowledge Module Identifier 110 contains a pre-defined list (array) of knowledge module 122 titles and for each knowledge module 122 title a list (array) of sub-module 120 titles. In addition, the author/content developer specifies a total number of pages ( number of knowledge objects 104 associated with the sub-module 120) for each sub-module 120 title.

An exemplary code segment showing these arrays is provided below:

```
...
mainTopics[0] = "System Safety";
mainTopics[1] = "Equipment Care";
mainTopics[2] = "User Manuals";
mainTopics[3] = "Service Software";
mainTopics[4] = "Technical Descriptions";
mainTopics[5] = "Spare Parts";
...
switch(activeTopic) {
       case 1:    // subtopics for main topic "System Safety"
                  subTopics[0] = ["Site Requirements",4];
                  subTopics[1] = ["Symbols and Labels",13];
                  subTopics[2] = ["Biohazard Considerations",3];
                  subTopics[3] = ["Acoustic Output",3];
                  subTopics[4] = ["Electrical Safety",3];
                  subTopics[5] = ["Device Compliance",1];
                  subTopics = addSubTopicsID(subTopics);
       result =
result.concat(numOfTopics,mainTopics,subTopics.length,subTopics);
       break;
...
```

(The mainTopics variables contain the knowledge module 122 titles. The subTopics variables contain the knowledge sub-module 120 titles and the total number of knowledge objects 104, i.e. pages, associated with the sub-module 120.)

For the Learn and Browse working modes, the order in which the titles are listed determines the order in which the knowledge modules 122 and sub-modules 120 are presented to the user. For the Perform working mode, the Perform Knowledge Module Identifier 110 defines the order depending on which topics/knowledge modules 122 the user has selected and what the sequence identifier's for the selected topics/knowledge modules are. The sequence of the knowledge objects 104 is determined by the file name of the knowledge object 104 (see below for details).

For the Perform working mode, each module 122 title includes a sequence identifier in addition to the actual title. The sequence identifier determines the order in which the selected procedures (topics or tasks) are presented to the user. The Knowledge Module Identifier 110 for the Perform working mode also contains program code for removing redundant sub-procedures/knowledge sub-modules 122 if applicable, described in more detail below.

When the Knowledge Module Identifiers 110 receive the parameter(s) from the index file, an array of information (based on the parameters received)is assembled and then returned to the index file. The array contains information such as the total number of knowledge modules 122 and their titles and the total number of knowledge sub-modules 120, their titles, and the total number of knowledge objects 104 associated with the knowledge sub-module 120 of the currently active (selected) knowledge module 122. The index file splits the information array received from the Knowledge Module Identifiers 110 and assigns the array contents to variables. The information is then used to determine the file names of the knowledge objects 104 for the currently active knowledge sub-module 120.

The file name of a knowledge object 104 is determined as follows: A JavaScript function called up by the index file reads the value for the current working mode (e.g. "Browse"), the title of the currently active sub-module 120 (e.g. "System Care"), and the total number of knowledge objects 104 associated with the sub-module 120 (e.g. 7). This information is then used by the function to create an array of (7) file. names:

[b_system_care_1.htm, b_system_care_2.htm, b_system_care_3.htm. b_system_care_4.htm. b_system_care_5.htm, b_system_care_6.htm. b_system_care_7.htm]

If the sub-module 120 title contains special characters (i.e., "/") the function removes all special characters to avoid invalid file names. The first letter of the file name indicates the working mode (l=Learn, p=Perform (alternately s=Service), b=Browse, and no letter indicates a shared knowledge object). This letter is used by the system 100 to determine where to look (which directory) for the particular file. The second part of the file name is the title of the sub-module 120 (converted to lowercase characters with all special characters removed). and the third part of the file name is the page number.

When the author/content developer creates a new knowledge object 104 for a sub-module 120, this naming convention is used. The page number that the author/content developer assigns to the file name determines the order in which the knowledge object 104 is presented to the user. For example, the file name b_system_care_5.htm indicates that the sequence position for this knowledge object 104 is 5 within the knowledge sub-module 120 "System Care." which is part of Browse mode.

The sequence information for the knowledge modules 122 and sub-modules 120 is stored in the respective Knowledge Module Identifier 110 file, and the sequence information for the knowledge objects 104 is determined by the author/content developer when assigning a file name to the knowledge object 104. The Knowledge Module Identifiers 110 specify how many knowledge objects 104 are associated with the knowledge sub-module 120.

Then the index file generates the list of knowledge modules 122 and active knowledge sub-modules 120 and links them accordingly. All events described above occur as the index file is loading.

Once the index file has finished loading, the first knowledge object 104 of the selected knowledge sub-module 120 is loaded into the CONTENTS frame. The index file invokes the loading of the first knowledge object 104. The loading of the first knowledge object 104 triggers the update of the HEADER frame. The file loaded into the header frame reads selected variable values (working mode, title of active knowledge module 122, the total number of pages of the active knowledge module 122, the total number of pages of the active knowledge sub-module 120). These values are stored in the index frame.

The header file also reads the title (information between the <title></title> tags of the knowledge object 104 HTML file) of the currently displayed knowledge object 104. The header file is used to determine and assemble the relevant information. The information is displayed in the header frame.

The file in the footer frame reads the absolute page number determined by the header file and enables/disables the forward and backward sequence icons/buttons or page arrows accordingly. In addition, the footer file reads the variable settings for the Help and Info icons in order to determine whether the Help and/or Info icons should be enabled or disabled. The setting for enabling/disabling the Help and/or Info icons is provided by the currently displayed knowledge object 104.

When the user sequences through the knowledge module 122, the information in the header and footer frames is updated accordingly. The same applies when the user selects a new knowledge module 122 or sub-module 120 from the index frame.

In referring to FIGS. 2A–2C, note that blocks 204, 214, 216, 218, 228, 230, 232, 240, 242, 244, 250, 252, 254, 256, 258, 260 and 270 are background tasks performed by the system 100. Blocks 208, 222, 246, and 262 present information to the user. Blocks 210, 224, 236, 248, 264, 266 and 268 involve receiving user input. The processing of blocks 254, 274, 276, 280, 282, 284 takes place as the index file is loaded. The processing of blocks 278, 256, 258, 286, 288 takes place in the knowledge module identifiers 110.

Figure 3:
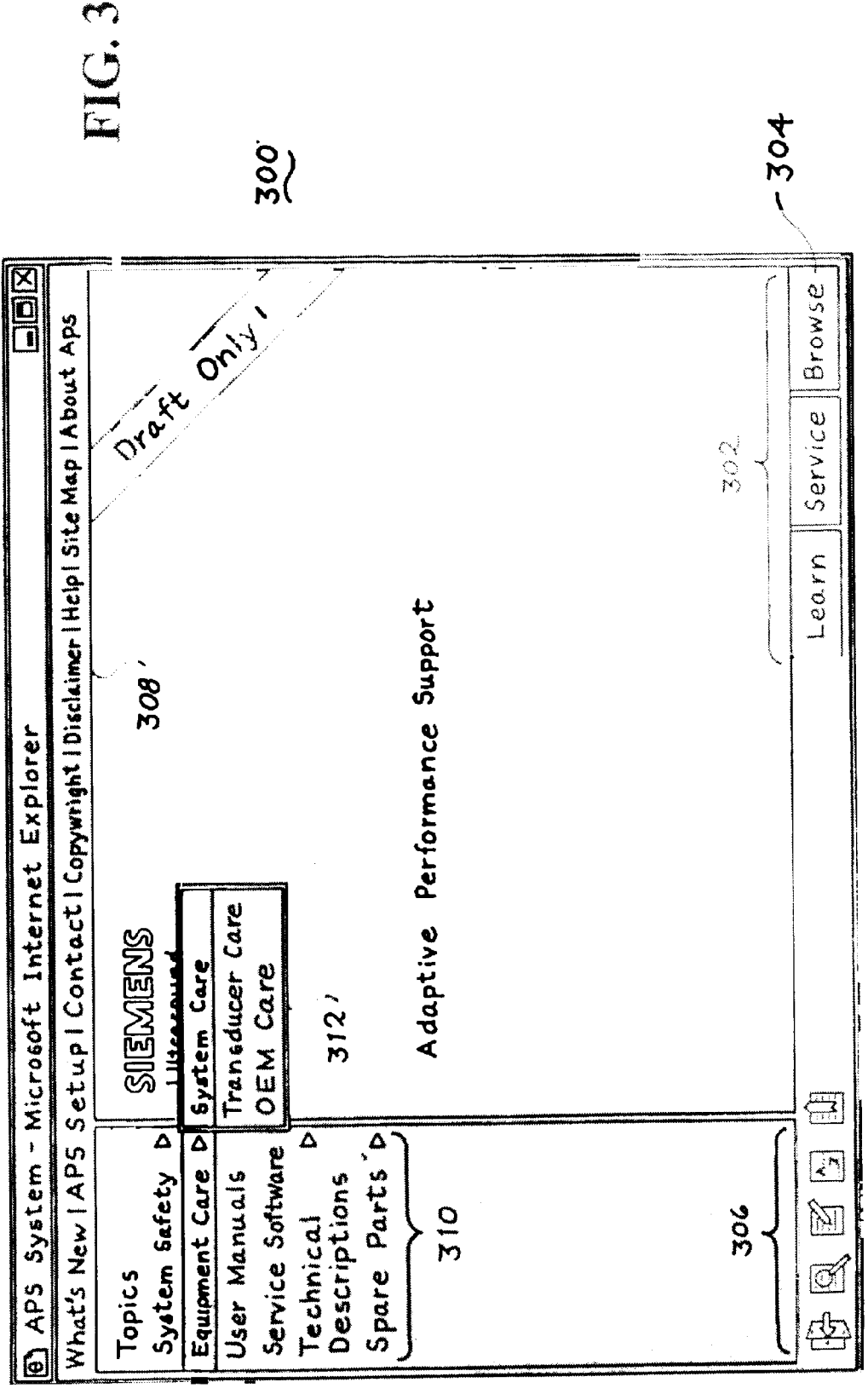
FIG. 3 depicts a first exemplary screen display generated by the embodiment of FIG. 1.
Figure 4:
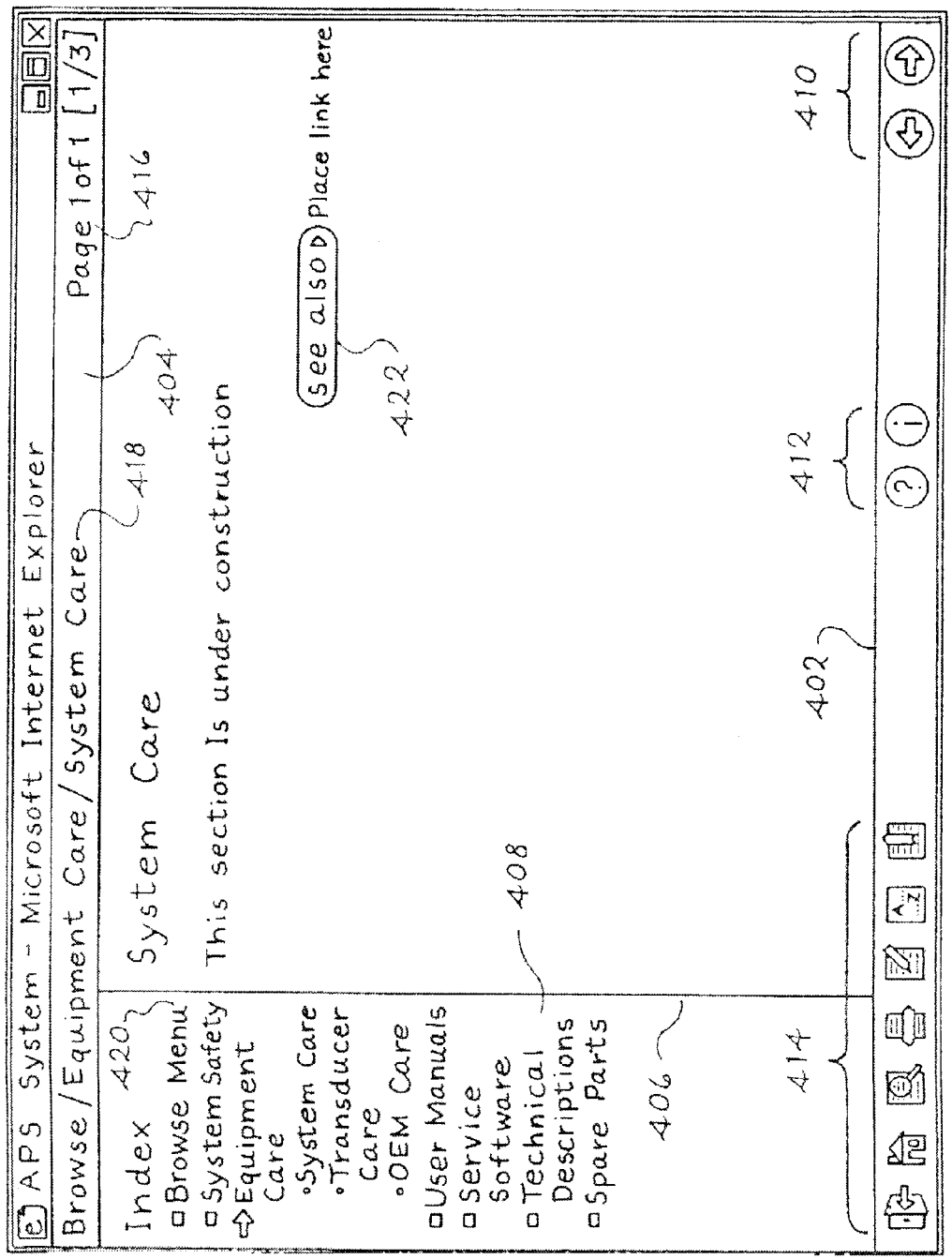
FIG. 4 depicts a second exemplary screen display generated by the embodiment of FIG. 1.

Referring now to FIGS. 3 and 4, there are shown exemplary screen displays from an embodiment of the adaptive performance support system 100. FIG. 3 shows an exemplary main menu screen 300 for the browse working mode. This screen 300 includes working mode option tabs 302, with the active browse working mode tab 304 highlighted, the common tool bar 306, and the common menus 308. The display 300 further shows the available knowledge modules 122 at 310 for the selected working mode and the available knowledge sub-modules 120 at 312 for the exemplary selected knowledge module 122, labeled "Equipment Care." The common tool bar 306 and common menus 308 are display elements which appear in all screen displays.

FIG. 4 shows an exemplary knowledge display screen 400 for the browse working mode. The screen 400 includes a footer frame 402, a header frame 404, a content display frame 406 and an index frame 408. The footer frame 402 contains forward and backward knowledge object 104 sequence icons/buttons 410, help and information icons/buttons 412 and the common tool bar 414. In this example, the backward sequence icon/button is showed as disabled indicating that this is the initial knowledge object 104 in the sequence of knowledge objects 104 within the knowledge sub-module 120. Further, the help and information icons/buttons 412 are shown as disabled indicating that the help and information functions are not available from this screen.

The header frame 404 includes a title 418 showing the current working mode, the selected knowledge module 122 and the selected knowledge sub-module 120. Further, the header frame 404 includes an indicator 416 showing the relative position of the currently displayed knowledge object 104 within the selected knowledge sub-module 120 and the absolute position within the selected knowledge module 122.

The index frame 408 displays the titles of available knowledge modules 122, indicates the selected knowledge module 122 and displays the available knowledge sub-modules 120 in the selected knowledge module 122. The index frame 408 further includes a link 420 to the main menu screen 300 of the Browse working mode.

The contents frame 406 displays the informative content of the current knowledge object 104. In the exemplary frame 406, the displayed knowledge object 104 includes a link 422 to a secondarily referenced knowledge object 104 which can be viewed to assist the user if necessary.

As was described above, a knowledge object 104 may contain one or more knowledge elements 126. As a knowledge object 104 is displayed, one or more of its knowledge elements 126 may be suppressed/filtered while others are presented in order to further adapt the presented content to the selected language, access level or working mode. In one embodiment, each knowledge element 128 is associated with an identifier 126 which identifies the composed language, access level and/or working mode of the knowledge element 128. The dynamic presentation manager 108 reads these identifiers as the content is presented and suppresses those knowledge elements 128 which do not match the current user settings.

In another embodiment, program code, such as dynamic HTML or JavaScript is included within the knowledge object 104. In one embodiment, program code is provided for each knowledge element 128 which suppresses display of that element based on pre-defined rules related to the current language, access level and/or working mode. As the knowledge object 104 is presented, the program code is executed. The code reads the stored settings from the cookies for the language, access level and/or working mode and determines whether or not to suppress the content of knowledge element 128 from display.

For example, a knowledge object 104 may contain two versions of the same content, one in English and one in French, as two separate knowledge elements 128. Each element 128 is further associated with program code which reads the current language setting and appropriately suppresses the knowledge element 128 containing the content in the unselected language.

In this way, there are two forms of adaptation that an author may utilize to tailor their content towards the various languages, access levels and working modes. Adaptation at the knowledge sub-module 120 level and adaptation within the knowledge object 104. Adaptation at the knowledge sub-module 120 level has been discussed and involves providing separate knowledge objects 104 for the different versions required, properly sequencing sub-modules 120 and removing redundant sub-modules 120 from a series of sub-modules 120. The knowledge sub-modules 120 are appropriately pre-defined to select the proper knowledge objects 104 dependent upon the settings of language, access level and/or working mode. Knowledge object 104 level adaptation is accomplished, as described above, by programming the knowledge object 104 with the different versions of the content as individual knowledge elements 128 which can be alternately suppressed dependent upon the settings of the language, access level and/or working mode. Typically, when different versions of a large volume of information are required, or for knowledge sub-modules 120 covering widely shared sub-topics, knowledge sub-module 120 adaptation will be used. For different versions of a small amount of information, knowledge object 104 level adaptation will be used.

For example, where an author provides different detailed descriptions in alternate languages, each description can be provided as a different knowledge object 104. However, where an author provides the main portion of the detailed description in only one language, with only a subset of that description to be presented in more than one language, the different versions may be provided as alternately suppressible knowledge elements 128 within a single knowledge object 104. For example, where a description of a control panel is in English and the individual controls are in French or in English, the knowledge object 104 can contain the main description in English with alternate language descriptions of the controls, such as stored in mouse-overs or other GUI display element.

The core process of the system 100 is a group of JavaScript and HTML files known collectively as the Dynamic Presentation Manager (DPM). The DPM includes Knowledge Module Identifier scripts for each working mode and access level. The scripts define which knowledge objects 104 to call for a selected knowledge module 122 and sub-module 120, based on user-defined variables.

In one embodiment, the knowledge pool 102 and dynamic presentation manager 108 are contained on a locally accessible media such as a computer hard disk or CD-ROM. This locally accessible media may also contain a browser program for accessing the dynamic presentation manager 108. In this embodiment, the system 100 may be operated on a personal computer, such as a Pentium III based personal computer or equivalent manufactured by Intel Corporation, located in Santa Clara, Calif., running the Windows 98 operating system, manufactured by Microsoft Corporation, located in Redmond, Washington and having at least 32 megabytes of RAM, 1 gigabyte of hard disk space and a CD-ROM drive. Other personal computers with varying capabilities and operating systems may also be used. In another embodiment, the knowledge pool 102 and dynamic presentation manager 108 are located on a network server which is accessible to a user utilizing a workstation, ultrasound system or other wired or wireless device, coupled with the network and operating a browser program as described above. In one embodiment, the network is a private intranet. In another embodiment, the network is the Internet. The network can comprise a publicly accessible network, such as the Internet, a private network, such as an intranet or combinations thereof, such as extranets and that the network is not limited to networks that utilize the TCP/IP protocol suite. Further, the knowledge pool 102 and the dynamic presentation manager 108 may be located on separate computer servers connected by the network as described.

In still another embodiment, the system 100 provides an annotation function that permits a user to add notes or other annotations to the content being presented. The annotations are associated with the knowledge objects 104 containing the presented content and displayed whenever that particular content is displayed. In one embodiment, the annotations are in the form of an electronic sticky note. In another embodiment, the annotations are indicated by the presence of a marker or token, the selection of which displays the annotation either in a new window or on the current display. Further, the system 100 may provide a method to allow a user to bookmark content, or otherwise indicate that they want to be able to directly access certain content in future sessions. While viewing particular content of a knowledge object 104, the user may select from a menu or a button or other GUI element to bookmark the content. The system 100 may further permit the user to annotate the bookmark with descriptive text identifying the subject matter in a way meaningful to the user. Once bookmarked, a selection is made available, in both the current and future sessions, in a menu or other GUI element displaying the bookmark and any accompanying annotation. Selection of the bookmark causes the associated content to be displayed. Functionality is also provided to allow the user to remove or modify existing bookmarks.

In another embodiment, a context sensitive help system is provided to assist the user with utilizing the system 100. The system 100 displays a help button or otherwise presents a help option, which the user may select at any time. Upon selection of the help option, the system 100 determines the context in which the user is operating and presents help information appropriate to that context.

In another embodiment, the system 100 provides assistance to the user in performing the specified task. For example, where a user is required to generate a report based on the performance of the task. In this example, after guiding the user through the performance of the task, or during the performance of the task, the system 100 prompts the user for information that can then be used to automatically fill out and generate the desired report. This functionality may be contained within a knowledge object 104, which is selected along with other knowledge objects 104 in the knowledge module 120, as described above. In addition, once the report is generated, the system 100 may facilitate electronic submission of the report to the desired entity. This submission may involve communicating the report over a network, as described above, or other communications media.

Included as appendix herein is a CD-ROM containing the computer program code of an exemplary system 100 as well as an exemplary knowledge pool 102 and collection of knowledge sub-modules 120 related to ultrasound system maintenance. It will be appreciated that this content is exemplary and that any content may be used with the disclosed system 100. The code includes hypertext markup language, cascading style sheet and JavaScript files which can be executed by a browser program such as Internet Explorer v5.0 manufactured by Microsoft Corporation, located in Redmond, Wash. The code references binary image files to display various icons and images as part of a graphic user interface and as part of the content. One of ordinary skill in the art will understand that such icons and images are known and that any suitable icons and images which appropriately indicate the represented function or content may be used. To operate the code, refer to the file listing included at the beginning of this document. All of the code, as well as suitable image files, should be loaded on a single media such as a CD-ROM or computer hard drive of a suitable computer using the directory structure as given. A suitable computer is one having a Pentium or similar class processor running Windows 98, second edition or later version at least 32 megabytes of RAM, at least 650 megabytes for the system 100 (in addition to necessary storage space for the operating system) or a CD-ROM drive. The computer should further include a keyboard, mouse or other suitable user input device, a display device, such as a monitor or flat panel display with the capability of generating and displaying graphics at a resolution of at least 640×480 at an 8 bit color depth. To access the system 100, the user should then execute the file "default.htm" which will start the system 100.

It is therefore intended that the foregoing detailed description be regarded as illustrative rather than limiting, and that it be understood that it is the following claims, including all equivalents, that are intended to define the spirit and scope of this invention.

We claim:

1. A method of facilitating access and presentation of information to a user, said method comprising;
   (a) receiving a first specification defining a first scope of subject-matter of interest to said user;
   (b) selecting, from a plurality of knowledge objects, a first selection of at least one relevant knowledge object having a second scope within said first scope and suppressing a knowledge object in said plurality of knowledge objects which contains information outside said first scope; and
   (c) presenting said first selection to said user.

2. The method of claim 1, wherein said first scope encompasses a first access level of said user, a first working mode and a first sub-topic.

3. The method of claim 1, wherein said first specification is received from said user.

4. The method of claim 1, wherein said first specification further defines a first working mode, said first working mode comprising one of Learn, Perform, and Browse.

5. The method of claim 4, wherein said Learn working mode comprises presentation of said information oriented in a tutorial form.

6. The method of claim 5, wherein said Learn working mode is further operative to assess said user's proficiency at said first sub-topic as instructed by said tutorial.

7. The method of claim 6, wherein said Learn working mode is further operative to generate said first specification.

8. The method of claim 5, wherein said Learn working mode is further operative to certify said user's proficiency at said first sub-topic as instructed by said tutorial.

9. The method of claim 4, wherein said Perform working mode comprises presentation of said information oriented in a guide form.

10. The method of claim 4, wherein said Browse working mode comprises presentation of said information in a browsable form.

11. The method of claim 1, wherein said first specification further defines a first sub-topic, said first sub-topic comprising a specific undertaking by said user including one of a lesson, task and subject.

12. The method of claim 1, wherein said first specification further defines a first access level, said first access level comprising a measure of said user's proficiency.

13. The method of claim 1, wherein said first specification further defines a first access level and a first sub-topic from a selection of available sub-topics, said selection being dependent on said first access level, said first access level comprising a measure of the required user proficiency for said selection.

14. The method of claim 1, wherein each of said plurality of knowledge objects comprises at least one of text, image, audio and video data.

15. The method of claim 1, wherein said plurality of knowledge objects comprises content related to operation and maintenance of an ultrasound system.

16. The method of claim 1, wherein said plurality of knowledge objects comprises a plurality of first subsets of knowledge objects, each of said plurality of first subsets related to one of a plurality of working modes, each of said first subsets further comprising a plurality of second subsets of knowledge objects, each of said plurality of second subsets oriented to one of a plurality of sub-topics, each of said plurality first subsets further comprising a plurality of third subsets of knowledge objects, each of said plurality of third subsets appropriate to one of a plurality of access levels.

17. The method of claim 16, wherein each knowledge object is comprised by a data file.

18. The method of claim 16, wherein each knowledge object is comprised by a portion of a data file.

19. The method of claim 1, wherein (b) further comprises selecting said at least one relevant knowledge object based on said at least one relevant knowledge object comprising information relevant to a first sub-topic, oriented to a first working mode and appropriate to a first access level.

20. The method of claim 19, wherein (b) further comprises selecting said at least one relevant knowledge object which comprises information appropriate to a method of presentation.

21. The method of claim 20, wherein said method of presentation comprises distance learning.

22. The method of claim 1, wherein (d) further comprises sequencing said at least one relevant knowledge object comprised in said first selection in a sequence order relevant to a first sub-topic, oriented to a first working mode and appropriate to a first access level.

23. The method of claim 1, wherein each of said at least one relevant knowledge object in said first selection is linked to another of said at least one relevant knowledge object in said first selection.

24. The method of claim 1, further comprising:
(d) adapting said at least one relevant knowledge object based on said first specification.

25. The method of claim 24 wherein (d) further comprises suppressing a portion of information contained within said at least one relevant knowledge object so as not to be presented.

26. The method of claim 1, wherein said first specification further defines a first access level, a first working mode and a first sub-topic and further wherein at least one of said plurality of knowledge objects further comprises a plurality of knowledge elements, each of said plurality of knowledge elements being relevant to one of a plurality of sub-topics, oriented to one of a plurality of working modes and appropriate to one of plurality of access levels, wherein (e) further comprises suppressing those of said plurality of knowledge elements in at least one of said plurality of knowledge objects in said first selection not relevant to said first sub-topic, not oriented to said first working mode and not appropriate to said first access level.

27. The method of claim 1, further comprising:
(d) receiving a second specification defining a second scope of subject-matter of interest to said user;
(e) selecting, from said plurality of knowledge objects, a second selection of at least one relevant knowledge object having a third scope within said second scope; and
(f) sequencing said first and second selections in an order appropriate to said first and second scopes; and
wherein (c) further comprises presenting both said first and second selections to said user according to said order.

28. The method of claim 1, wherein (c) further comprises allowing access to at least one of said plurality of knowledge objects outside of said first scope during said presentation.

29. The method of claim 1, wherein (e) further comprises presenting a first of said at least one knowledge object in said sequence, said method further comprising:
(f) receiving interaction from said user indicating a desire to change from said first of said at least one knowledge object to a second of said at least one knowledge object in said sequence; and
(g) presenting said second of said at least one knowledge object based on said interaction.

30. The method of claim 1, wherein said first specification is received over a network and said at least one knowledge object is presented to said user over said network.

31. The method of claim 1, wherein said first specification is received from an ultrasound system and said at least one knowledge object is presented to said user via said ultrasound system.

32. The method of claim 1, wherein said first specification is received from a world wide web browser computer program and wherein each of said at least one relevant knowledge object in said first selection comprises content, (c) further comprising transmitting said content to said world wide web browser computer program.

33. The method of claim 1, further comprising:
(f) receiving annotation from said user;
(g) storing said annotation associated with said selection; and
(h) presenting said annotation in conjunction with said first selection.

34. The method of claim 1, further comprising:
(f) receiving interaction from said user with said presentation;
(g) receiving a request for assistance from said user; and
(f) providing said assistance to said user, said assistance comprising information contextually appropriate to said interaction.

35. The method of claim 1, further comprising:
(f) receiving a search query comprising a query for information comprised by said plurality of knowledge objects;
(g) searching said plurality of knowledge objects based on said search query and on said first working mode; and
(h) presenting results of said search relevant to said query and oriented to said first working mode.

36. The method of claim 1, further comprising:
(f) receiving an indication from said user to mark one or more of said at least one relevant knowledge object in said first selection for subsequent direct access by said user
(g) storing said indication in a user accessible storage, said stored indication being associated with said one or more of said at least one relevant knowledge object;
(h) presenting said user accessible storage to said user;
(i) receiving a selection of said stored indication from said user; and
(i) presenting said associated one or more of said at least one relevant knowledge object to said user.

37. The method of claim 1, wherein said first specification further defines a first sub-topic, said method further comprising:
(f) assisting said user in completion of said first sub-topic.

38. The method of claim 37, wherein said first sub-topic comprises a requirement generate a report, (f) further comprising automatically generating said report.

39. The method of claim 1, wherein said first scope comprises a language for said information to be presented in and wherein (b) is further based on said first specification.

40. A system for facilitating access and presentation of information to a user, said system comprising:
a user interface operative to receive a first specification defining a first access level of said user, a second specification defining a first working mode, and a third specification defining a first sub-topic; and
a knowledge pool including a plurality of knowledge objects;
a knowledge selector coupled with said user interface and said knowledge pool and operative to select a first selection of at least one relevant of said plurality of knowledge object based on said first, second and third specifications from said knowledge pool and provide said first selection to said user interface; and
wherein said user interface is further operative to present said first selection to said user.

41. The system of claim 40, wherein said first working mode comprises one of Learn, Perform, and Browse.

42. The system of claim 40, wherein said first sub-topic comprises a specific undertaking by said user including one of a lesson, task and subject.

43. The system of claim 40, wherein said first access level comprises a measure of said user's proficiency.

44. The system of claim 40, wherein each of said plurality of knowledge objects comprises at least one of text, image, audio and video data.

45. The system of claim 41, wherein said plurality of knowledge objects comprise content related to operation and maintenance of an ultrasound system.

46. The system of claim 40, wherein said plurality of knowledge objects comprises a plurality of first subsets of knowledge objects, each of said plurality of first subsets related to one of a plurality of working modes, each of said first subsets further comprising a plurality of second subsets of knowledge objects, each of said plurality of second subsets oriented to one of a plurality of sub-topics, each of said plurality first subsets further comprising a plurality of third subsets, each of said plurality of third subsets appropriate to one of a plurality of access levels.

47. The system of claim 40, wherein said knowledge selector is further operative to select said at least one relevant knowledge object based on said at least one relevant knowledge object comprising information relevant to said first sub-topic, oriented to said first working mode and appropriate to said access level.

48. The system of claim 40, wherein said knowledge selector is further operative to determine which of said plurality of knowledge objects meet said first, second and third specifications.

49. The system of claim 40, wherein said knowledge selector is further operative to adapt said at least one relevant knowledge object based on at least one of said first, second and third specifications.

50. The system of claim 49, wherein said knowledge selector is further operative to suppress a portion of information contained within said at least one relevant knowledge object so as not to be presented.

51. The system of claim 40, wherein at least one of said plurality of knowledge objects further comprises a plurality of knowledge elements, each of said plurality of knowledge elements being relevant to one of a plurality of sub-topics, oriented to one of a plurality of working modes and appropriate to one of plurality of access levels, wherein said knowledge selector is further operative to suppress those of said plurality of knowledge elements in at least one of said plurality of knowledge objects in said first selection not relevant to said first sub-topic, not oriented to said first working mode and not appropriate to said first access level.

52. The system of claim 40, wherein:
said user interface is further operative to receive a fourth specification defining a second sub-topic;
said knowledge selector is further operative to select a second selection of at least one relevant knowledge object based on said first, second and fourth specifications from said plurality of knowledge objects; and sequence said first and second selections in an order relevant to said first and second sub-topics, oriented to said first working mode and appropriate to said first access level; and
wherein said user interface is further operative to present both said first and second selections to said user according to said order.

53. The system of claim 40, wherein said user interface is further operative to present a first of said at least one knowledge object in said sequence, receive interaction from said user indicating a desire to change from said first of said at least one knowledge object to a second of said at least one knowledge object in said sequence, and present said second of said at least one knowledge object based on said interaction.

54. The system of claim 40, further comprising a network interface operative to interface said user interface with a network, and wherein user interface is further operative to receive said first, second and third specification over said network and present said at least one knowledge object to said user over said network.

55. The system of claim 40, wherein said user interface is further operative to interact with said user via an ultrasound system.

56. The system of claim 40, wherein said user interface comprises a world wide web browser computer program.

57. The system of claim 40, wherein said user interface is further operative to receive annotation from said user, store said annotation associated with said selection, and present said annotation in conjunction with said first selection.

58. The system of claim 40, further comprising a sub-topic assistant operative to automate portions of said first sub-topic.

59. The system of claim 58, wherein said first sub-topic comprises a requirement to generate a report, said sub-topic assistant being further operative to automatically generating said report.

60. The system of claim 40, wherein said user interface is further operative to receive a fourth specification defining a language for said information to be presented in and said knowledge selector is further operative to select said first selection based on said fourth specification.

61. A knowledge aggregator comprising:
a knowledge pool, said knowledge pool including a plurality of knowledge objects, each of said plurality of knowledge objects comprising content relevant to at least one sub-topic, oriented to at least one mode of access and appropriate to at least one level of competence;
an interface operative to receive a specification comprising a level of competence, a mode of access and a sub-topic;
a process coupled with said interface and said knowledge pool and operative to determine a sequence of said plurality of knowledge objects which are relevant to said sub-topic, oriented to said mode of access and appropriate to said level of competence; and
wherein said interface is further operative to provide said content of said knowledge objects in said sequence to a display coupled with said interface.

62. The knowledge aggregator of claim 61, wherein said mode of access comprises one of Learn, Perform, and Browse.

63. The knowledge aggregator of claim 61, wherein said sub-topic comprises a specific undertaking by said user.

64. The knowledge aggregator of claim 61, wherein said level of competence comprises a measure of a user's proficiency at said sub-topic.

65. The knowledge aggregator of claim 61, wherein each of said plurality of knowledge objects comprises at least one of text, image, audio and video data.

66. The knowledge aggregator of claim 61, wherein said content of each of said plurality of knowledge objects is further composed in one of at least one language.

67. The knowledge aggregator of claim 61, wherein said process is further operative to suppress presentation of content within said each of said plurality of knowledge objects within said sequence not relevant to sub-topic, not oriented to said mode of access and not appropriate to at said level of competence.

68. A method of facilitating access and presentation of information to a user, said information being related to the operation and maintenance of an ultrasound system, said method comprising:
(a) receiving a first specification defining at least a first access level of said user;
(b) establishing a first working mode and a first sub-topic;
(c) selecting, from a plurality of knowledge objects, a first selection of at least one relevant knowledge object based on said first access level, said first working mode and said first sub-topic; and
(d) presenting said first selection to said user.

69. The method of claim 68, wherein (b) further comprises establishing said first working mode and said first sub-topic based on said first specification.

70. The method of claim 69, wherein said first specification further defines said first working mode and said first sub-topic.

71. The method of claim 69, wherein said first working mode and said first sub-topic are defined with default values where said first specification fails to define said first working mode and said first sub-topic.

72. The method of claim 68, further comprising:
(e) receiving a second specification defining said first working mode; and
(f) receiving a third specification defining said first sub-topic.

73. The method of claim 68, wherein said first working mode comprises a service working mode.

74. The method of claim 68, wherein said first sub-topic comprises a specific task to be undertaken by said user.

75. The method of claim 68, wherein said first access level comprises a measure of said user's proficiency.

76. The method of claim 68, wherein each of said plurality of knowledge objects comprises at least one of text, image, audio and video data.

77. The method of claim 68, wherein (d) further comprises selecting said at least one relevant knowledge object based on said at least one relevant knowledge object comprising information relevant to said first sub-topic, oriented to said first working mode and appropriate to said first access level.

78. The method of claim 77, wherein (d) further comprises selecting said at least one relevant knowledge object which comprises information appropriate to a method of presentation.

79. The method of claim 68, wherein (d) further comprises suppressing a knowledge object in said plurality of knowledge objects which contains information extraneous to said first sub-topic, unoriented to said first working mode and inappropriate to said first access level.

80. The method of claim 68, wherein (d) further comprises sequencing said at least one relevant knowledge object comprised in said first selection in a sequence order relevant to said first sub-topic, oriented to said first working mode and appropriate to said first access level.

81. The method of claim 68, further comprising:
(e) adapting said at least one relevant knowledge object based on at least one of said first, second and third specifications.

82. The method of claim 81, wherein (f) further comprises suppressing a portion of information contained within said at least one relevant knowledge object so as not to be presented.

83. The method of claim 68, wherein said first specification is received over a network and said at least one knowledge object is presented to said user over said network.

84. The method of claim 68, further comprising:

(e) assisting said user in completion of said first sub-topic.

85. The method of claim 84, wherein said first sub-topic comprises a requirement generate a report, (f) further comprising automatically generating said report.

86. The method of claim 68, further comprising:

(e) receiving a second specification defining a language for said information to be presented in; and wherein said selecting is further based on said language.

87. A method of facilitating access and presentation of information to a user, said information comprising at least one sub-topic being related to the operation and maintenance of an ultrasound system, said method comprising:

(a) establishing a content display mode;

(a) establishing a user proficiency level;

(c) selecting a sub-set of said at least one sub-topic as a function of said content display mode and said user proficiency level;

(d) receiving a selection of one of said at least one sub-topic from said sub-set; and (e) presenting said selected one of said at least one sub-topic.

* * * * *